United States Patent
Spero et al.

(10) Patent No.: US 12,551,883 B2
(45) Date of Patent: Feb. 17, 2026

(54) MAGNETIC-BASED ACTUATION MECHANISMS FOR AND METHODS OF ACTUATING MAGNETICALLY RESPONSIVE MICROPOSTS IN A REACTION CHAMBER

(71) Applicant: Redbud Labs, Inc., Research Triangle Park, NC (US)

(72) Inventors: Richard Chasen Spero, Research Triangle Park, NC (US); Jay Kenneth Fisher, Research Triangle Park, NC (US)

(73) Assignee: Redbud Labs, Inc., Research Triangle Park, NC (US)

( * ) Notice: Subject to any disclaimer, the term of this patent is extended or adjusted under 35 U.S.C. 154(b) by 1432 days.

(21) Appl. No.: 17/045,201

(22) PCT Filed: Apr. 7, 2019

(86) PCT No.: PCT/US2019/026225
§ 371 (c)(1),
(2) Date: Oct. 5, 2020

(87) PCT Pub. No.: WO2019/195818
PCT Pub. Date: Oct. 10, 2019

(65) Prior Publication Data
US 2021/0039096 A1 Feb. 11, 2021

Related U.S. Application Data
(60) Provisional application No. 62/654,048, filed on Apr. 6, 2018.

(51) Int. Cl.
| | |
|---|---|
| *B01L 3/00* | (2006.01) |
| *H01F 7/02* | (2006.01) |
| *H02K 37/06* | (2006.01) |
| *H02K 37/12* | (2006.01) |
| *H02K 37/24* | (2006.01) |

(52) U.S. Cl.
CPC ..... *B01L 3/502715* (2013.01); *B01L 3/50273* (2013.01); *H01F 7/02* (2013.01);
(Continued)

(58) Field of Classification Search
CPC .......... B01L 3/50273; B01L 3/502746; B01L 3/502715; B01L 3/502761;
(Continued)

(56) References Cited

U.S. PATENT DOCUMENTS

| | | | | |
|---|---|---|---|---|
| 2003/0219713 | A1* | 11/2003 | Valencia | G01N 33/80 |
| | | | | 435/7.1 |
| 2005/0185569 | A1* | 8/2005 | Coombs | G01N 35/00069 |
| | | | | 369/275.3 |

(Continued)

FOREIGN PATENT DOCUMENTS

| | | |
|---|---|---|
| CN | 101108721 A | 1/2008 |
| CN | 101405033 A | 4/2009 |

(Continued)

OTHER PUBLICATIONS

International Search Report and Written Opinion issued in counterpart PCT Application No. PCT/US2019/026225 dated Jun. 28, 2019 (thirteen (13) pages).

(Continued)

*Primary Examiner* — Shogo Sasaki
(74) *Attorney, Agent, or Firm* — E. Eric Mills; Nicholas P. Stadnyk; Maynard Nexsen PC

(57) ABSTRACT

Magnetic-based actuation mechanisms for and methods of actuating magnetically responsive microposts in a reaction (or assay) chamber is disclosed. Namely, a microfluidics system is provided that includes a microfluidics device (or cartridge) that includes the reaction (or assay) chamber in which a field of surface-attached magnetically responsive microposts is installed. The presently disclosed magnetic- (Continued)

based actuation mechanisms are provided in close proximity to the magnetically responsive microposts wherein the magnetic-based actuation mechanisms are used for actuating the magnetically responsive microposts. Namely, the magnetic-based actuation mechanisms generate an actuation force that is used to compel at least some of the magnetically responsive microposts to exhibit motion. Additionally, methods of using the presently disclosed magnetic-based actuation mechanisms for actuating the magnetically responsive microposts are provided.

16 Claims, 34 Drawing Sheets

(52) U.S. Cl.
CPC .............. *H02K 37/06* (2013.01); *H02K 37/12* (2013.01); *H02K 37/24* (2013.01); *B01L 2300/06* (2013.01); *B01L 2300/12* (2013.01); *B01L 2400/043* (2013.01)

(58) Field of Classification Search
CPC ......... B01L 3/502753; B01L 2200/066; B01L 2300/0877; B01L 2400/086; B01L 2400/043; B01L 2300/06; B01L 2300/0816; B01L 2300/12; B01L 2400/0433; B01L 2300/123; B01F 33/4533; B01F 33/3038; H02K 37/06; H02K 37/24; H02K 37/12; H01F 7/02
See application file for complete search history.

(56) References Cited

U.S. PATENT DOCUMENTS

| | | | | |
|---|---|---|---|---|
| 2009/0033935 A1* | 2/2009 | Chung | ................... | B82Y 15/00 356/338 |
| 2010/0165784 A1 | 7/2010 | Jovanovich et al. | | |
| 2012/0014836 A1* | 1/2012 | Dittmer | ............ | G01N 33/54326 422/69 |
| 2012/0045828 A1 | 2/2012 | Davis et al. | | |
| 2013/0109012 A1 | 5/2013 | Sniadecki et al. | | |
| 2014/0260742 A1 | 9/2014 | Arlt et al. | | |
| 2014/0352382 A1 | 12/2014 | Wang et al. | | |
| 2016/0146798 A1* | 5/2016 | Donolato | ......... | G01N 33/54373 435/7.1 |
| 2016/0186240 A1 | 6/2016 | Andreyev et al. | | |
| 2017/0015835 A1 | 1/2017 | Aizenberg et al. | | |
| 2017/0246630 A1 | 8/2017 | Gaynor et al. | | |
| 2018/0011090 A1 | 1/2018 | Bornheimer et al. | | |

FOREIGN PATENT DOCUMENTS

| | | | |
|---|---|---|---|
| CN | 101479591 | A | 7/2009 |
| CN | 102341691 | A | 2/2012 |
| CN | 104044630 | A | 9/2014 |
| CN | 105441308 | A | 3/2016 |
| CN | 106029863 | A | 10/2016 |
| CN | 107429281 | A | 12/2017 |
| CN | 107850524 | A | 3/2018 |
| WO | 2006087655 | A1 | 8/2006 |
| WO | 2010151780 | A2 | 12/2010 |
| WO | 2017049279 | A1 | 3/2017 |

OTHER PUBLICATIONS

Judith et al., Micro-elastometry on whole blood clots using actuated surface-attached posts (ASAPs). Lab Chip. 15 (5): 1385-1393 (2015).
Spero, Richard Chasen et al., Nanoparticle diffusion measures bulk clot permeability. Biophys J. 101(4):943-950 (2011).
Wang, Yu Ji, et al., Rapid fabrication of integrated high-gradient magnetic separation microfluidic device. Journal of Functional Materials and Devices. 14(4):751-756 (2008).

* cited by examiner

MAGNETIC-BASED ACTUATION MECHANISMS FOR AND METHODS OF ACTUATING MAGNETICALLY RESPONSIVE MICROPOSTS IN A REACTION CHAMBER

CROSS REFERENCE TO RELATED APPLICATIONS

This application is a 35 U.S.C. § 371 U.S. national phase entry of International Application No. PCT/US2019/026225 having an international filing date of Apr. 7, 2019, which claims the benefit of U.S. Provisional Application No. 62/654,048, filed Apr. 6, 2018, the entire disclosures of which are incorporated herein by reference in their entirety.

TECHNICAL FIELD OF THE INVENTION

The presently disclosed subject matter relates generally to methods of processing biological fluids (or biofluids) and more particularly to magnetic-based actuation mechanisms for and methods of actuating magnetically responsive microposts in a reaction (or assay) chamber.

BACKGROUND

Microfluidic systems can include an active surface, which can be, for example, any surface or area (typically inside a reaction (or assay) chamber) that is used for processing biological materials. Various fluidic operations, such as, but not limited to, mixing operations, washing operations, binding operations, and cell processing operations, can take place within the reaction (or assay) chamber. However, there is often little or poor control of the fluid flowing within the chamber. Therefore, new approaches are needed to provide better fluid flow control in a microfluidic system.

SUMMARY OF THE INVENTION

To address the foregoing problems, in whole or in part, and/or other problems that may have been observed by persons skilled in the art, the present disclosure provides compositions and methods as described by way of example as set forth below.

The presently disclosed subject matter provides magnetic-based actuation mechanisms for and methods of actuating magnetically responsive microposts in a reaction (or assay) chamber. Namely, a microfluidics system is provided that includes a microfluidics device (or cartridge) that includes a reaction (or assay) chamber in which a field of surface-attached magnetically responsive microposts is installed. The presently disclosed magnetic-based actuation mechanisms are provided in close proximity to the magnetically responsive microposts wherein the magnetic-based actuation mechanisms are used for actuating the magnetically responsive microposts. Namely, the magnetic-based actuation mechanisms generate an actuation force that is used to compel at least some of the magnetically responsive microposts to exhibit motion.

In some embodiments, the magnetic-based actuation mechanism is a disc- or cylinder-shaped magnet that is movable (e.g., rotatable) via, for example, a miniature sized brushed or brushless DC motor. In one example, the magnet can be a diametrically magnetized (DM) magnet. In another example, the magnet can be an axially magnetized (AM) magnet. The moving (e.g., rotating) magnet provides a moving (e.g., rotating) magnetic field with respect to the magnetically responsive microposts, wherein the moving (e.g., rotating) magnetic field is an example of the actuation force.

In other embodiments, the magnetic-based actuation mechanism is one or more plate magnets, one or more metal plates, a magnetic shield, or any combinations thereof for (1) holding the magnetically responsive microposts in a substantially upright or vertical (i.e., for stiffening the magnetically responsive microposts), and (2) returning the magnetically responsive microposts to a substantially upright or vertical position after being knocked down.

In yet other embodiments, magnetic shielding may be used to control the actuation force of the presently disclosed magnetic-based actuation mechanisms, wherein the magnetic shielding is arranged in a plane between the magnet and the plane of the magnetically responsive microposts and wherein the magnetic shielding is movable for either allowing the magnetic field of the magnet to reach the magnetically responsive microposts or blocking the magnetic field of the magnet from reaching the magnetically responsive microposts.

In yet other embodiments, any number, types, configurations, and/or combinations of the presently disclosed magnetic-based actuation mechanisms can be used in combination.

In still other embodiments, linear translation mechanisms (X, Y, and Z) can be used for controlling the positions of one or more of the presently disclosed magnetic-based actuation mechanisms with respect to one or more microfluidics device.

Additionally, methods of using the presently disclosed magnetic-based actuation mechanisms for actuating the magnetically responsive microposts are provided.

In still other embodiments, a microfluidics system is provided comprising:

at least one microfluidic device comprising a reaction chamber, wherein the reaction chamber comprises an active surface, wherein the active surface is magnetically responsive; and at least one magnetic-based actuation mechanism provided in close proximity to the active surface, wherein the at least one magnetic-based actuation mechanism is configured to generate an actuation force sufficient to activate the active surface;

wherein the at least one magnetic-based actuation mechanism comprises one or more movable disc- or cylinder-shaped magnets, one or more plate magnets, one or more metal plates, one or more magnetic shields, or combinations thereof. In some embodiments, the active surface comprises a micropost field comprising surface-attached magnetically responsive microposts, wherein the at least one magnetic-based actuation mechanism is provided in close proximity to the magnetically responsive microposts, and wherein the at least one magnetic-based actuation mechanism is configured to generate an actuation force sufficient to compel at least some of the magnetically responsive microposts to exhibit motion.

In still other embodiments, a microfluidics system is provided comprising:

at least one microfluidic device comprising a reaction chamber, wherein the reaction chamber comprises an active surface, wherein the active surface is magnetically responsive;

at least one magnetic-based actuation mechanism provided in close proximity to the active surface, wherein the at least one magnetic-based actuation mechanism is configured to generate an actuation force sufficient to activate the active surface; and one or more magnetic shields at least partially surrounding the at least one microfluidic device and/or the at least one magnetic-based actuation mechanism
wherein the at least one magnetic-based actuation mechanism comprises one or more movable disc- or cylinder-shaped magnets, one or more plate magnets, one or more metal plates, or combinations thereof. In some embodiments, the one or more magnetic shields at least partially surround the at least one microfluidic device and are stationary. In other embodiments, the one or more magnetic shields at least partially surround the at least one magnetic-based actuation mechanism and are movable. In further embodiments, the at least one magnetic-based actuation mechanism is movable, and wherein the one or more magnetic shields are attached to and move with the at least one magnetic-based actuation mechanism. In still further embodiments, the active surface comprises a micropost field comprising surface-attached magnetically responsive microposts, wherein the at least one magnetic-based actuation mechanism is provided in close proximity to the magnetically responsive microposts, and wherein the at least one magnetic-based actuation mechanism is configured to generate an actuation force sufficient to compel at least some of the magnetically responsive microposts to exhibit motion.

Other compositions, methods, features, and advantages of the invention will be or will become apparent to one with skill in the art upon examination of the following figures and detailed description. It is intended that all such additional compositions, methods, features, and advantages be included within this description, be within the scope of the invention, and be protected by the accompanying claims.

BRIEF DESCRIPTION OF THE DRAWINGS

The features and advantages of the present invention will be more clearly understood from the following description taken in conjunction with the accompanying drawings, which are not necessarily drawn to scale, and wherein.

DETAILED DESCRIPTION

Figure 1:
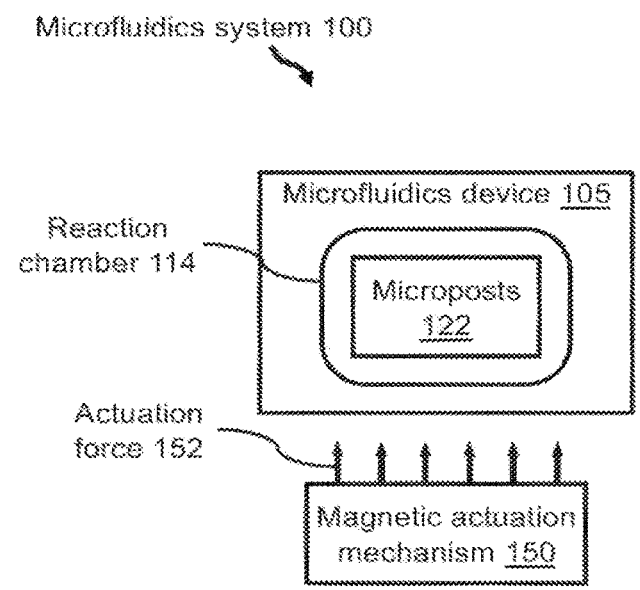
FIG. 1 illustrates a block diagram of an example of a microfluidics system that includes a microfluidics device in combination with the presently disclosed magnetic-based actuation mechanisms for actuating surface-attached microposts.

The presently disclosed subject matter now will be described more fully hereinafter with reference to the accompanying Drawings, in which some, but not all embodiments of the presently disclosed subject matter are shown. Like numbers refer to like elements throughout. The presently disclosed subject matter may be embodied in many different forms and should not be construed as limited to the embodiments set forth herein; rather, these embodiments are provided so that this disclosure will satisfy applicable legal requirements. Indeed, many modifications and other embodiments of the presently disclosed subject matter set forth herein will come to mind to one skilled in the art to which the presently disclosed subject matter pertains having the benefit of the teachings presented in the foregoing descriptions and the associated Drawings. Therefore, it is to be understood that the presently disclosed subject matter is not to be limited to the specific embodiments disclosed and that modifications and other embodiments are intended to be included within the scope of the appended claims.

General Definitions

As used herein "active surface" means any surface or area that can be used for processing samples including, but not limited to, biological materials, fluids, environmental samples (e.g., water samples, air samples, soil samples, solid and liquid wastes, and animal and vegetable tissues), and industrial samples (e.g., food, reagents, and the like). The active surface can be inside a reaction or assay chamber. For example, the active surface can be any surface that has properties designed to manipulate the fluid inside the chamber. Manipulation can include, for example, generating fluid flow, altering the flow profile of an externally driven fluid, fractionating the sample into constituent parts, establishing or eliminating concentration gradients within the chamber, and the like. Surface properties that might have this effect can include, for example, post technology—whether static or actuated (i.e., activated). The surface properties may also include microscale texture or topography in the surface, physical perturbation of the surface by vibration or deformation; electrical, electronic, electromagnetic, and/or magnetic system on or in the surface; optically active (e.g., lenses) surfaces, such as embedded LEDs or materials that interact with external light sources; and the like.

As used herein, the terms "surface-attached post" or "surface-attached micropost" or "surface-attached structure" are used interchangeably. Generally, a surface-attached structure has two opposing ends: a fixed end and a free end. The fixed end may be attached to a substrate by any suitable means, depending on the fabrication technique and materials employed. The fixed end may be "attached" by being integrally formed with or adjoined to the substrate, such as by a microfabrication process. Alternatively, the fixed end may be "attached" via a bonding, adhesion, fusion, or welding process. The surface-attached structure has a length defined from the fixed end to the free end, and a cross-section lying in a plane orthogonal to the length. For example, using the Cartesian coordinate system as a frame of reference, and associating the length of the surface-attached structure with the z-axis (which may be a curved axis), the cross-section of the surface-attached structure lies in the x-y plane.

Generally, the cross-section of the surface-attached structure may have any shape, such as rounded (e.g., circular, elliptical, etc.), polygonal (or prismatic, rectilinear, etc.), polygonal with rounded features (e.g., rectilinear with rounded corners), or irregular. The size of the cross-section of the surface-attached structure in the x-y plane may be defined by the "characteristic dimension" of the cross-section, which is shape-dependent. As examples, the characteristic dimension may be diameter in the case of a circular cross-section, major axis in the case of an elliptical cross-section, or maximum length or width in the case of a polygonal cross-section. The characteristic dimension of an irregularly shaped cross-section may be taken to be the dimension characteristic of a regularly shaped cross-section that the irregularly shaped cross-section most closely approximates (e.g., diameter of a circle, major axis of an ellipse, length or width of a polygon, etc.).

A surface-attached structure as described herein is non-movable (static, rigid, etc.) or movable (flexible, deflectable, bendable, etc.) relative to its fixed end or point of attachment to the substrate. To facilitate the movability of movable surface-attached structures, the surface-attached structure may include a flexible body composed of an elastomeric (flexible) material, and may have an elongated geometry in the sense that the dominant dimension of the surface-attached structure is its length—that is, the length is substantially greater than the characteristic dimension. Examples of the composition of the flexible body include, but are not limited to, elastomeric materials such as hydrogel and other active surface materials (for example, polydimethylsiloxane (PDMS)).

The movable surface-attached structure is configured such that the movement of the surface-attached structure relative to its fixed end may be actuated or induced in a non-contacting manner, specifically by an applied magnetic or electric field of a desired strength, field line orientation, and frequency (which may be zero in the case of a magnetostatic or electrostatic field). To render the surface-attached structure movable by an applied magnetic or electric field, the surface-attached structure may include an appropriate metallic component disposed on or in the flexible body of the surface-attached structure. To render the surface-attached structure responsive to a magnetic field, the metallic component may be a ferromagnetic material such as, for example, iron, nickel, cobalt, or magnetic alloys thereof, one non-limiting example being "alnico" (an iron alloy containing aluminum, nickel, and cobalt). To render the surface-attached structure responsive to an electric field, the metallic component may be a metal exhibiting good electrical conductivity such as, for example, copper, aluminum, gold, and silver, and well as various other metals and metal alloys. Depending on the fabrication technique utilized, the metallic component may be formed as a layer (or coating, film, etc.)

on the outside surface of the flexible body at a selected region of the flexible body along its length. The layer may be a continuous layer or a densely grouped arrangement of particles. Alternatively, the metallic component may be formed as an arrangement of particles embedded in the flexible body at a selected region thereof.

As used herein, the term "actuation force" refers to the force applied to the microposts. For example, the actuation force may include a magnetic, thermal, sonic, or electric force. Notably, the actuation force may be applied as a function of frequency or amplitude, or as an impulse force (i.e., a step function). Similarly, other actuation forces may be used without departing from the scope of the present subject matter, such as fluid flow across the micropost array (e.g., flexible microposts that are used as flow sensors via monitoring their tilt angle with an optical system).

Accordingly, the application of an actuation force actuates the movable surface-attached microposts into movement. For example, the actuation occurs by contacting cell processing chamber with the control instrument comprising elements that provide an actuation force, such as a magnetic or electric field. Accordingly, the control instrument includes, for example, any mechanisms for actuating the microposts (e.g., magnetic system), any mechanisms for counting the cells (e.g., imaging system), the pneumatics for pumping the fluids (e.g., pumps, fluid ports, valves), and a controller (e.g., microprocessor).

As used herein, a "flow cell" is any chamber comprising a solid surface across which one or more liquids can be flowed, wherein the chamber has at least one inlet and at least one outlet.

The term "micropost array" is herein used to describe an array of small posts, extending outwards from a substrate, that typically range from 1 to 100 micrometers in height. In one embodiment, microposts of a micropost array may be vertically-aligned. Notably, each micropost includes a proximal end that is attached to the substrate base and a distal end or tip that is opposite the proximal end. Microposts may be arranged in arrays such as, for example, the microposts described in U.S. Pat. No. 9,238,869, entitled "Methods and systems for using actuated surface-attached posts for assessing biofluid rheology," issued on Jan. 19, 2016; the entire disclosure of which is incorporated herein by reference. U.S. Pat. No. 9,238,869 describes methods, systems, and computer readable media for using actuated surface-attached posts for assessing biofluid rheology. One method described in U.S. Pat. No. 9,238,869 is directed to testing properties of a biofluid specimen that includes placing the specimen onto a micropost array having a plurality of microposts extending outwards from a substrate, wherein each micropost includes a proximal end attached to the substrate and a distal end opposite the proximal end, and generating an actuation force in proximity to the micropost array to actuate the microposts, thereby compelling at least some of the microposts to exhibit motion. This method further includes measuring the motion of at least one of the microposts in response to the actuation force and determining a property of the specimen based on the measured motion of the at least one micropost.

U.S. Pat. No. 9,238,869 also states that the microposts and micropost substrate of the micropost array can be formed of polydimethylsiloxane (PDMS). Further, microposts may include a flexible body and a metallic component disposed on or in the body, wherein application of a magnetic or electric field actuates the microposts into movement relative to the surface to which they are attached (e.g., wherein the actuation force generated by the actuation mechanism is a magnetic and/or electrical actuation force).

"Magnetically responsive" means responsive to a magnetic field. "Magnetically responsive microposts" include or are composed of magnetically responsive materials. Examples of magnetically responsive materials include, but are not limited to, paramagnetic materials, ferromagnetic materials, ferrimagnetic materials, and metamagnetic materials. Examples of suitable paramagnetic materials include iron, nickel, and cobalt, as well as metal oxides, such as, but not limited to, ferroferric oxide ($Fe_3O_4$), barium hexaferrite ($BaFe_{12}O_{19}$), cobalt(II) oxide (CoO), nickel(II) oxide (NiO), manganese(III) oxide ($Mn_2O_3$), chromium(III) oxide ($Cr_2O_3$), and cobalt manganese phosphide (CoMnP).

Following long-standing patent law convention, the terms "a," "an," and "the" refer to "one or more" when used in this application, including the claims. Thus, for example, reference to "a subject" includes a plurality of subjects, unless the context clearly is to the contrary (e.g., a plurality of subjects), and so forth.

Throughout this specification and the claims, the terms "comprise," "comprises," and "comprising" are used in a non-exclusive sense, except where the context requires otherwise. Likewise, the term "include" and its grammatical variants are intended to be non-limiting, such that recitation of items in a list is not to the exclusion of other like items that can be substituted or added to the listed items.

For the purposes of this specification and appended claims, unless otherwise indicated, all numbers expressing amounts, sizes, dimensions, proportions, shapes, formulations, parameters, percentages, quantities, characteristics, and other numerical values used in the specification and claims, are to be understood as being modified in all instances by the term "about" even though the term "about" may not expressly appear with the value, amount or range. Accordingly, unless indicated to the contrary, the numerical parameters set forth in the following specification and attached claims are not and need not be exact, but may be approximate and/or larger or smaller as desired, reflecting tolerances, conversion factors, rounding off, measurement error and the like, and other factors known to those of skill in the art depending on the desired properties sought to be obtained by the presently disclosed subject matter. For example, the term "about," when referring to a value can be meant to encompass variations of, in some embodiments, ±100% in some embodiments ±50%, in some embodiments ±20%, in some embodiments ±10%, in some embodiments ±5%, in some embodiments ±1%, in some embodiments ±0.5%, and in some embodiments ±0.1% from the specified amount, as such variations are appropriate to perform the disclosed methods or employ the disclosed compositions.

Further, the term "about" when used in connection with one or more numbers or numerical ranges, should be understood to refer to all such numbers, including all numbers in a range and modifies that range by extending the boundaries above and below the numerical values set forth. The recitation of numerical ranges by endpoints includes all numbers, e.g., whole integers, including fractions thereof, subsumed within that range (for example, the recitation of 1 to 5 includes 1, 2, 3, 4, and 5, as well as fractions thereof, e.g., 1.5, 2.25, 3.75, 4.1, and the like) and any range within that range.

Magnetic-Based Actuation Mechanisms for Actuating Magnetically Responsive Microposts in a Reaction Chamber and Methods of Using Same The presently disclosed subject matter provides magnetic-based actuation mechanisms for and methods of actuating magnetically responsive microposts in a reaction (or assay) chamber. Namely, a microfluidics system is provided that includes a microfluidics device (or cartridge) that includes a reaction (or assay) chamber in which a field of surface-attached magnetically responsive microposts is installed. The presently disclosed magnetic-based actuation mechanisms are provided in close proximity to the magnetically responsive microposts wherein the magnetic-based actuation mechanisms are used for actuating the magnetically responsive microposts. Namely, the magnetic-based actuation mechanisms generate an actuation force that is used to compel at least some of the magnetically responsive microposts to exhibit motion.

In some embodiments, the magnetic-based actuation mechanism is a disc- or cylinder-shaped magnet that is movable (e.g., rotatable) via, for example, a miniature sized brushed or brushless DC motor. In one example, the magnet can be a diametrically magnetized (DM) magnet. In another example, the magnet can be an axially magnetized (AM) magnet. The moving (e.g., rotating) magnet provides a moving (e.g., rotating) magnetic field with respect to the magnetically responsive microposts, wherein the moving (e.g., rotating) magnetic field is an example of the actuation force.

In other embodiments, the magnetic-based actuation mechanism is one or more plate magnets, one or more metal plates, a magnetic shield, or any combinations thereof for (1) holding the magnetically responsive microposts in a substantially upright or vertical (i.e., for stiffening the magnetically responsive microposts), and (2) returning the magnetically responsive microposts to a substantially upright or vertical position after being knocked down.

In yet other embodiments, magnetic shielding may be used to control the actuation force of the presently disclosed magnetic-based actuation mechanisms, wherein the magnetic shielding is arranged in a plane between the magnet and the plane of the magnetically responsive microposts and wherein the magnetic shielding is movable for either allowing the magnetic field of the magnet to reach the magnetically responsive microposts or blocking the magnetic field of the magnet from reaching the magnetically responsive microposts.

In yet other embodiments, any number, types, configurations, and/or combinations of the presently disclosed magnetic-based actuation mechanisms can be used in combination.

In still other embodiments, linear translation mechanisms (X, Y, and Z) can be used for controlling the positions of one or more of the presently disclosed magnetic-based actuation mechanisms with respect to one or more microfluidics device.

Additionally, a method of using the presently disclosed magnetic-based actuation mechanisms for actuating the magnetically responsive microposts is provided.

Referring now to FIG. 1 is a block diagram of an example of a microfluidics system 100 that includes a microfluidics device 105 in combination with the presently disclosed magnetic-based actuation mechanisms for actuating surface-attached magnetically responsive microposts. Microfluidics device 105 of microfluidics system 100 is, for example, a microfluidics cartridge that includes a reaction (or assay) chamber 114. Arranged in reaction (or assay) chamber 114 is a field of microposts 122. Microposts 122 are provided in a substantially continuous field or array that span the area of reaction (or assay) chamber 114.

Magnetic actuation mechanism 150 is arranged in close proximity to reaction (or assay) chamber 114 of microfluidics device 105, wherein magnetic actuation mechanism 150 is used for applying an actuation force 152 to the surface-attached microposts 122. As described elsewhere herein, the term "actuation force" refers to the force applied to microposts 122. Magnetic actuation mechanism 150 is used to generate an actuation force (e.g., actuation force 152) in proximity to reaction (or assay) chamber 114 that compels at least some of microposts 122 to exhibit motion. In microfluidics system 100, the microposts 122 of microfluidics device 105 are magnetically responsive microposts. Accordingly, the actuation force 152 provided by magnetic actuation mechanism 150 is a magnetic actuation force. Further, the magnetic actuation force 152 of magnetic actuation mechanism 150 may be applied as a function of frequency or amplitude, or as an impulse force (i.e., a step function). Namely, the magnetic actuation force 152 of magnetic actuation mechanism 150 may be a time-varying actuation force.

In microfluidics device 105 of microfluidics system 100, the magnetically responsive microposts 122 in combination with magnetic actuation mechanism 150 can be used to enhance various fluidic operations, such as, but not limited to, mixing operations, washing operations, binding operations, and cell processing operations, within reaction (or assay) chamber 114, as compared to a microfluidics device that is absent the magnetically responsive microposts 122 and the magnetic actuation mechanism 150. More details of microposts 122 are shown and described hereinbelow with reference to FIG. 2A, FIG. 2B, FIG. 3A, and FIG. 3B. More details of microfluidics device 105 are shown and described hereinbelow with reference to FIG. 4A, FIG. 4B, FIG. 5, FIG. 6, and FIG. 7.

Figure 2A:
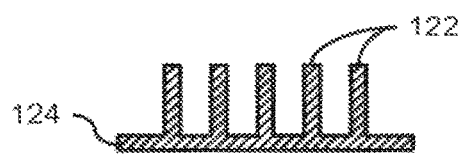
FIG. 2A and FIG. 2B illustrate side views of an example of microposts of the microfluidics device.
Figure 2B:
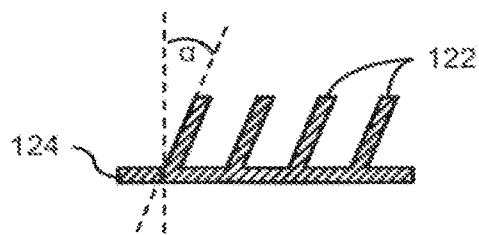

Referring now to FIG. 2A and FIG. 2B is side views of an example of microposts 122 of microfluidics device 105, wherein microposts 122 can be arranged in a micropost field or array. As used herein, the term "micropost field" is used interchangeably with the term "micropost array" as defined elsewhere herein. Accordingly, an arrangement of microposts 122 are provided in a micropost field or array on a substrate 124.

Microposts 122 and substrate 124 can be formed, for example, of PDMS. The length, diameter, geometry, orientation, and pitch of microposts 122 in the field or array can vary. For example, the length of microposts 122 can vary from about 1 μm to about 100 μm. The diameter of microposts 122 can vary from about 0.1 μm to about 10 μm. Further, the cross-sectional shape of microposts 122 can vary as described elsewhere herein. For example, the cross-sectional shape of microposts 122 can be circular, ovular, square, rectangular, triangular, and so on. The orientation of microposts 122 can vary. For example, FIG. 2A shows microposts 122 oriented substantially normal to the plane of substrate 124, while FIG. 2B shows microposts 122 oriented at an angle α with respect to normal of the plane of substrate 124. In a neutral position with no actuation force applied, the angle α can be, for example, from about 0 degrees to about 45 degrees. Additionally, the pitch of microposts 122 within a micropost field or array can vary, for example, from about 0 μm to about 50 μm. Further, the relative positions of microposts 122 within the micropost field or array can vary.

Figure 3A:
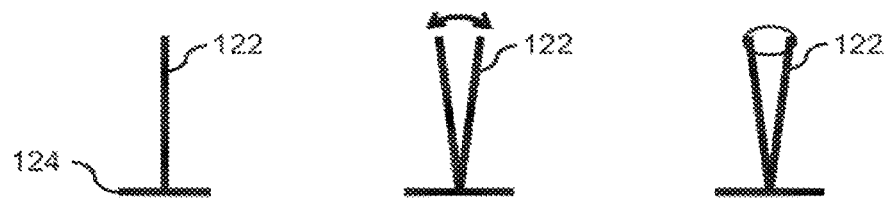
FIG. 3A and FIG. 3B illustrate side views of a micropost and show examples of the actuation motion thereof.
Figure 3B:
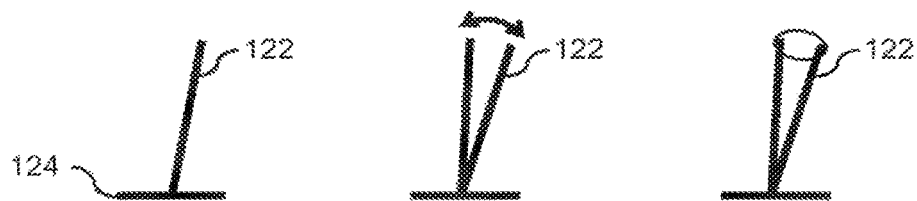

FIG. 3A and FIG. 3B illustrate sides views of a micropost 122 and show examples of the actuation motion thereof. Namely, FIG. 3A shows an example of a micropost 122 oriented substantially normal to the plane of substrate 124. FIG. 3A shows that the distal end of the micropost 122 can move (1) with side-to-side 2D motion only with respect to the fixed proximal end or (2) with circular motion with respect to the fixed proximal end, which is a cone-shaped motion. By contrast, FIG. 3B shows an example of a micropost 122 oriented at an angle with respect to the plane of substrate 124. FIG. 3B shows that the distal end of the micropost 122 can move (1) with tilted side-to-side 2D motion only with respect to the fixed proximal end or (2) with tilted circular motion with respect to the fixed proximal end, which is a tilted cone-shaped motion. In microfluidics device 105, by actuating microposts 122 and causing motion thereof, any fluid in reaction (or assay) chamber 114 is in effect stirred or caused to flow or circulate within reaction (or assay) chamber 114 and across the surface area thereof, as shown, for example, in FIG. 6 and FIG. 7. Further, the cone-shaped motion of micropost 122 shown in FIG. 3A, as well as the tilted cone-shaped motion of micropost 122 shown in FIG. 3B, can be achieved using a moving (e.g., rotating) magnetic field. A moving (e.g., rotating) magnetic field is one example of actuation force 152 of magnetic actuation mechanism 150.

Referring still to FIG. 1 through FIG. 3B, microposts 122 are based on, for example, the microposts described in U.S. Pat. No. 9,238,869, as described elsewhere herein. In one example, according to U.S. Pat. No. 9,238,869, microposts 122 and substrate 124 can be formed of PDMS. Further, microposts 122 may include a flexible body and a metallic component disposed on or in the body, wherein application of a magnetic or electric field actuates microposts 122 into movement relative to the surface to which they are attached. Again, in this example, the actuation force generated by magnetic actuation mechanism 150 is a magnetic actuation force.

Figure 4A:
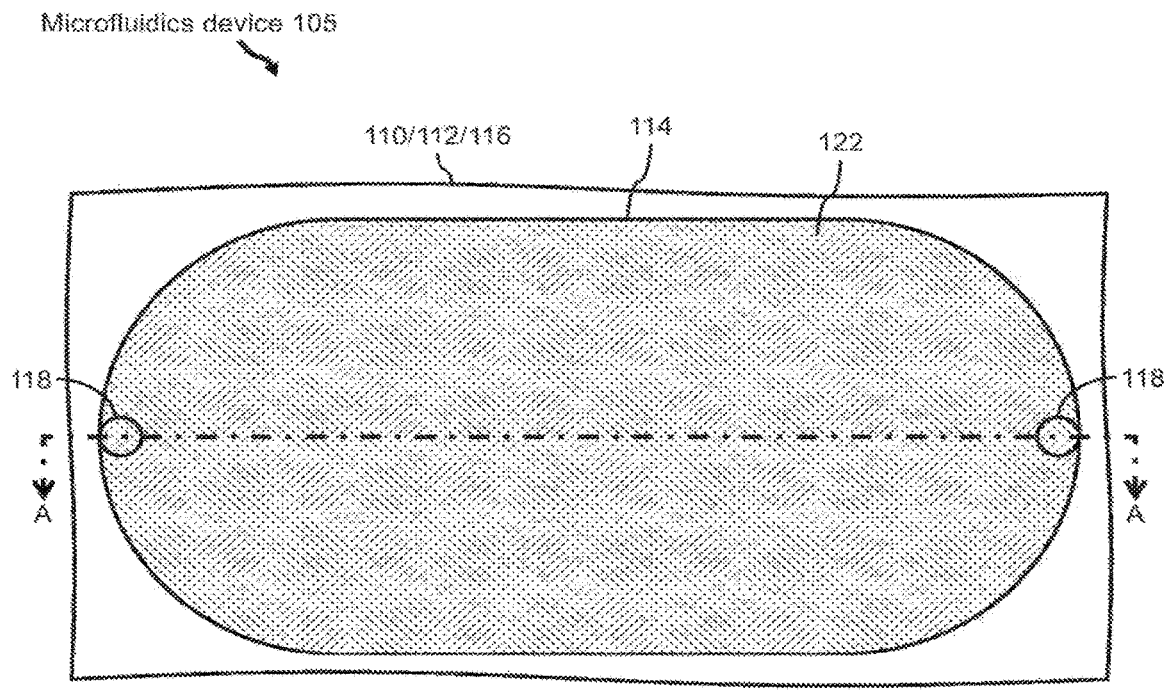
FIG. 4A and FIG. 4B illustrate a plan view and a cross-sectional view, respectively, of an example of the microfluidics device of the microfluidics system shown in FIG. 1, wherein the microfluidics device has a reaction (or assay) chamber that includes a field of microposts.
Figure 4B:
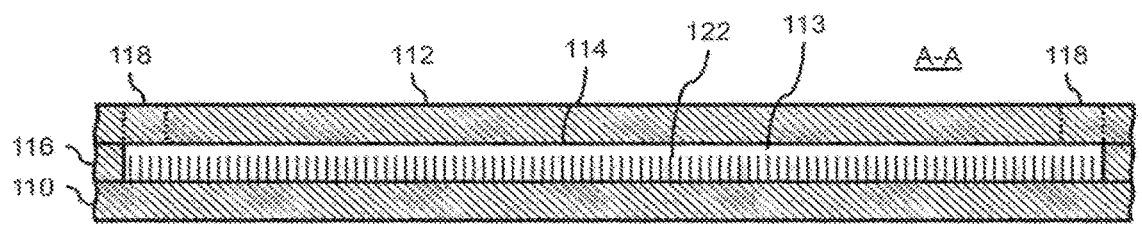

FIG. 4A and FIG. 4B is a plan view and a cross-sectional view, respectively, of an example of microfluidics device 105 of microfluidics system 100 shown in FIG. 1. The cross-sectional view of FIG. 4B is taken along line A-A of FIG. 4A. Further, FIG. 5 is a cross-sectional view of microfluidics device 105 shown in combination with magnetic actuation mechanism 150, which is one example of the presently disclosed magnetic-based actuation mechanisms.

Figure 5:
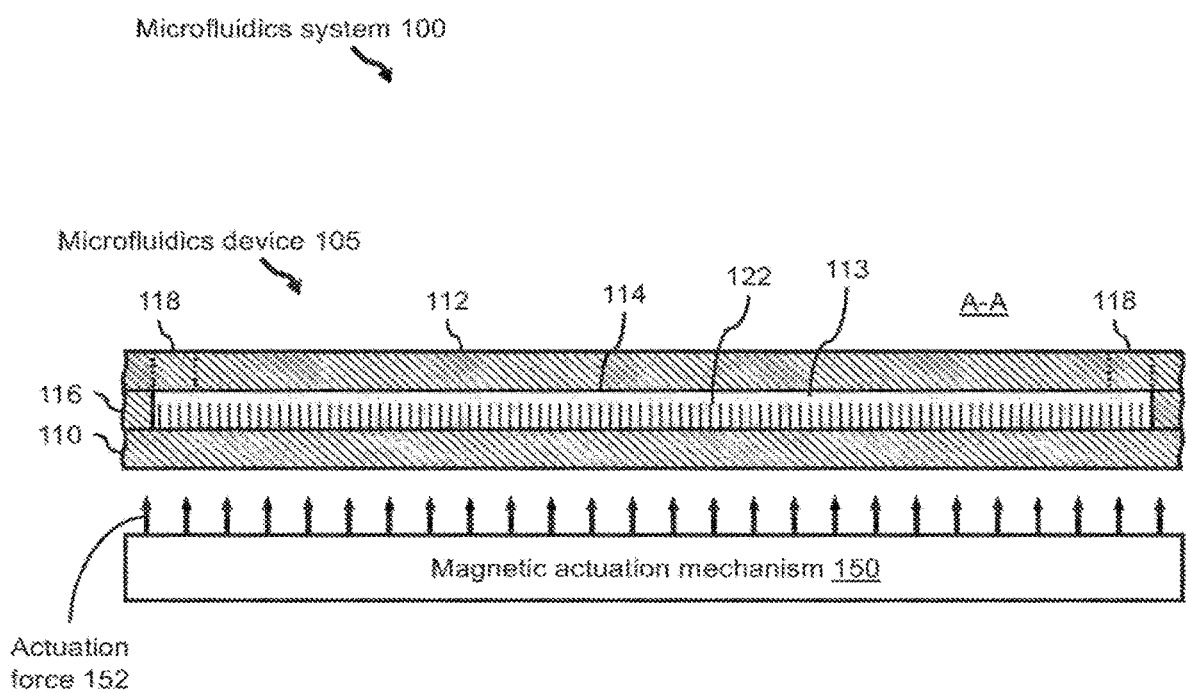
FIG. 5 illustrates a cross-sectional view of the microfluidics device shown in FIG. 4A and FIG. 4B in combination with the presently disclosed magnetic-based actuation mechanisms.

Referring now to FIG. 4A, FIG. 4B, and FIG. 5, microfluidics device 105 has reaction (or assay) chamber 114 that includes a field of magnetically responsive microposts 122. For example, microfluidics device 105 includes a bottom substrate 110 and a top substrate 112 separated by a gap 113, thereby forming the reaction (or assay) chamber 114 between bottom substrate 110 and top substrate 112. A spacer or gasket 116 may be provided between bottom substrate 110 and top substrate 112 to form gap 113 and define the area of reaction (or assay) chamber 114. Bottom substrate 110 and top substrate 112 can be formed, for example, of plastic or glass. Fluid ports 118 are provided, for example, in top substrate 112. For example, two fluid ports 118 are provided, one at each end (e.g., an inlet and an outlet) for loading fluid into reaction (or assay) chamber 114. In this example, microfluidics device 105 provides a simple "flow cell" type of chamber. As described elsewhere herein, a flow cell can be any chamber comprising a solid surface across which one or more liquids can be flowed, wherein the chamber has at least one inlet and at least one outlet. Various fluidic operations, such as, but not limited to, mixing operations, washing operations, binding operations, and cell processing operations, can take place within reaction (or assay) chamber 114.

Reaction (or assay) chamber 114 of microfluidics device 105 can be sized to hold any volume of fluid. The height of gap 113 of reaction (or assay) chamber 114 can be, for example, from about 50 μm to about 1 mm. A field of magnetically responsive microposts 122 is provided on the inner surface of bottom substrate 110. However, in various embodiments, microposts 122 can be provided on bottom substrate 110 only, top substrate 112 only, or on both bottom substrate 110 and top substrate 112.

FIG. 5 shows magnetic actuation mechanism 150 arranged in close proximity to reaction (or assay) chamber 114 of microfluidics device 105. Namely, microposts 122 are within the magnetic field (not shown) generated by magnetic actuation mechanism 150, wherein the magnetic field is the actuation force that can be used to actuate the magnetically responsive microposts 122.

Figure 6:
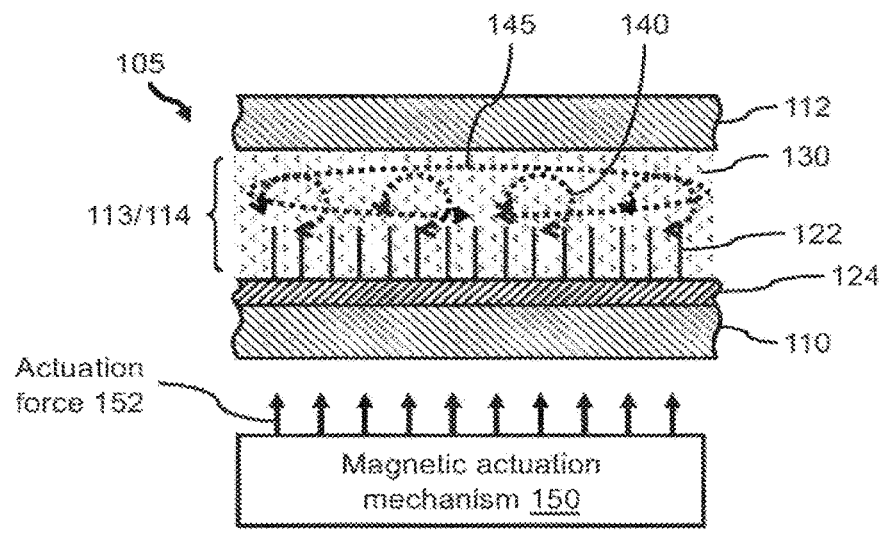
FIG. 6 illustrates a side view of a portion of the microfluidics device, wherein the presently disclosed magnetic-based actuation mechanisms is positioned below the microfluidics device.
Figure 7:
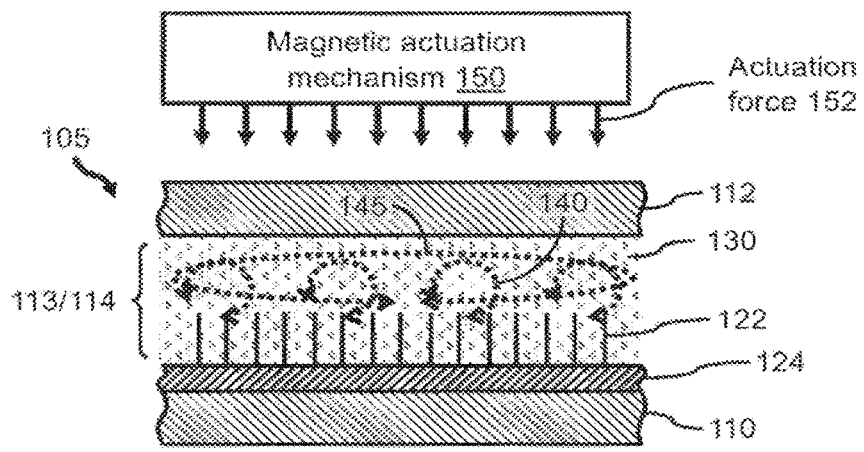
FIG. 7 illustrates a side view of a portion of the microfluidics device, wherein the presently disclosed magnetic-based actuation mechanisms is positioned above the microfluidics device.

By actuating microposts 122 and causing motion thereof, the sample fluid (not shown) in gap 113 is in effect stirred or caused to flow or circulate within gap 113 of reaction (or assay) chamber 114 as shown, for example, in FIG. 6 and FIG. 7. For example, FIG. 6 shows a side view of a portion of microfluidics device 105, wherein magnetic actuation mechanism 150 is positioned below the microfluidics device; while FIG. 7 shows a side view of a portion of microfluidics device 105, wherein magnetic actuation mechanism 150 is positioned above microfluidics device 105.

In either configuration, microposts 122 can be actuated into movement via the magnetic actuation force 152 from magnetic actuation mechanism 150. For example, the application of a magnetic field from magnetic actuation mechanism 150 actuates the magnetically responsive microposts 122 into movement. Namely, a sample fluid 130 is provided within gap 113 of reaction (or assay) chamber 114. Then, magnetic actuation mechanism 150 generates actuation force 152 in proximity to the field of microposts 122 that compels at least some of microposts 122 to exhibit motion. In so doing, both regions of local circulation 140 and bulk circulation 145 occur within reaction (or assay) chamber 114 of microfluidics device 105. In one example, due to the presence of regions of local circulation 140 and bulk circulation 145 created by the motion of microposts 122 in reaction (or assay) chamber 114 of microfluidics device 105 the reaction time can be significantly reduced compared with applications that rely on diffusion alone for flow and/or mixing. For example, compared with applications that rely on diffusion alone, microfluidics device 105 and magnetic actuation mechanism 150 can be used to reduce the reaction time from hours or days to a few minutes only.

Figure 8:
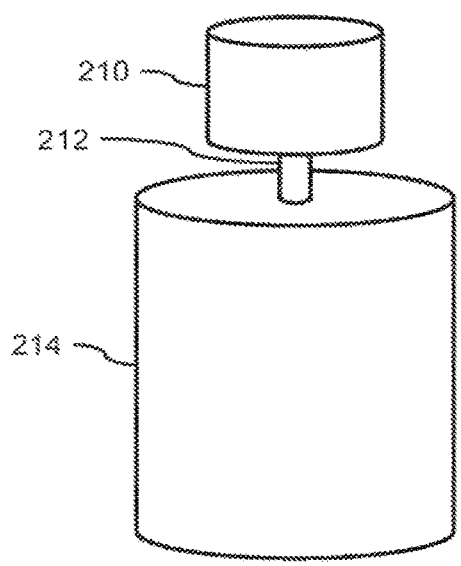
FIG. 8 illustrates a perspective view of a magnetic actuation mechanism, which is one example of the presently disclosed magnetic-based actuation mechanisms.
Figure 9A:
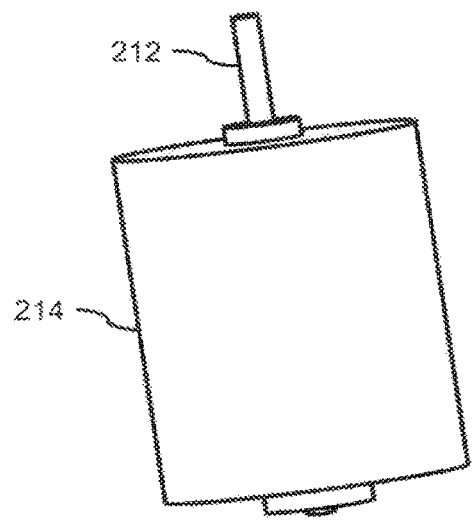
FIG. 9A, FIG. 9B, FIG. 10A, FIG. 10B, FIG. 11A, and FIG. 11B show views of multiple examples of the motor of the magnetic actuation mechanism shown in FIG. 8.
Figure 9B:
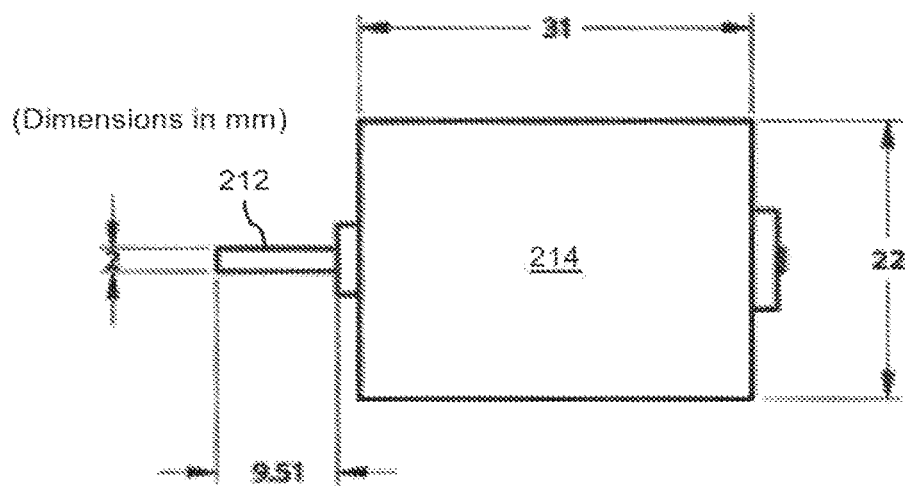
Figure 10A:
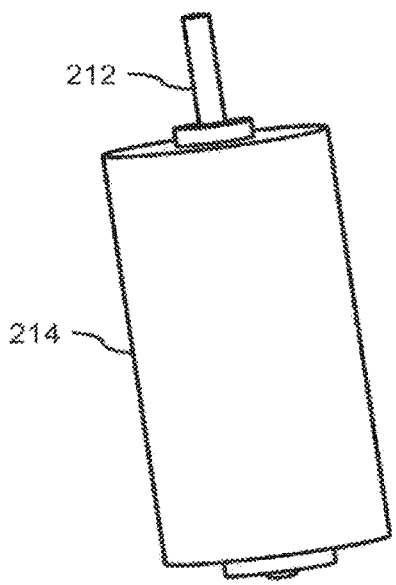
Figure 10B:
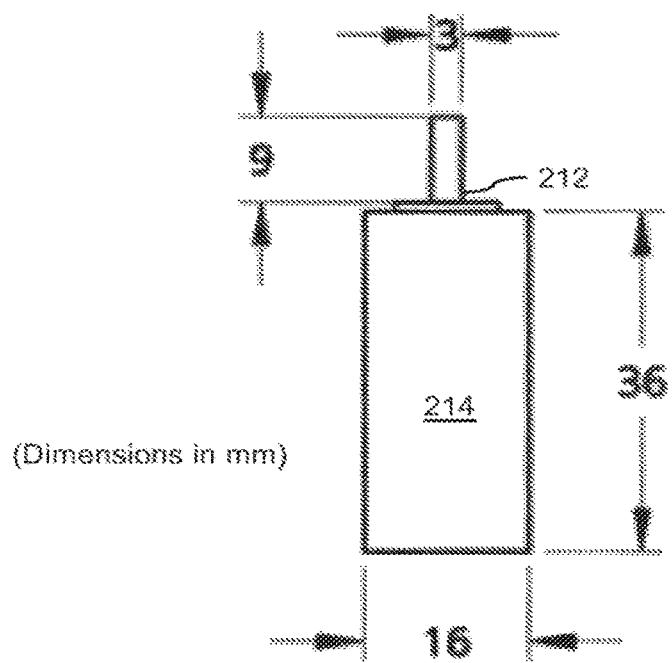
Figure 11A:
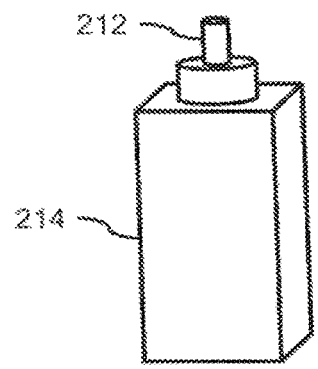
Figure 11B:
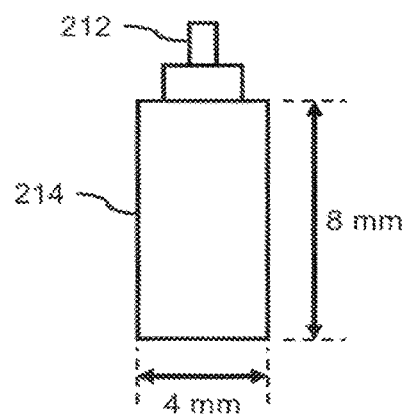

Referring now to FIG. 8 is a perspective view of a magnetic actuation mechanism 200, which is one example of the presently disclosed magnetic-based actuation mechanisms. Namely, magnetic actuation mechanism 200 is one example of the magnetic actuation mechanism 150 shown in FIG. 1. In this example, magnetic actuation mechanism 200 includes a magnet 210 mounted on a motor shaft 212 of a motor 214. Accordingly, magnet 210 is movable, particularly magnet 210 is movable (e.g., rotatable). Magnet 210 is a permanent magnet. Magnet 210 can be, for example, a cylinder-shaped magnet. In one example, magnet 210 is a diametrically magnetized permanent magnet (see FIG. 12). That is, magnet 210 is magnetized transverse of motor shaft 212. In another example, magnet 210 is an axially magnetized permanent magnet (see FIG. 13). That is, magnet 210 is magnetized along the axis of motor shaft 212. The magnetic flux density B of magnet 210 can be, for example, from about 10 millitesla (mT) to about 500 mT.

Motor 214 can be, for example, any miniature sized brushed or brushless DC motor. Motor 214 may operate, for example, from about 1,000 rpm to about 20,000 rpm or from about 2,000 rpm to about 15,000 rpm or from about 7,000 rpm to about 10,000 rpm. FIG. 9A, FIG. 9B, FIG. 10A, FIG. 10B, FIG. 11A, and FIG. 11B show views of multiple examples of motor 214 of magnetic actuation mechanism 200 shown in FIG. 8. In a first example and referring now to FIG. 9A and FIG. 9B, motor 214 is a brushed DC motor, such as the 12GS88 Athlonix Brush DC High Power Density Motor available from Portescap (West Chester, PA). In a next example and referring now to FIG. 10A and FIG. 10B, motor 214 is a brushless DC motor, such as the 16ECP36 ULTRA EC Slotless Brushless DC Motor available from Portescap (West Chester, PA). In a next example and referring now to FIG. 11A and FIG. 11B, motor 214 is a brushed DC micro pager motor (e.g., 0408 series), such as the vibration motors that are used in pagers and mobile phones.

Figure 12:
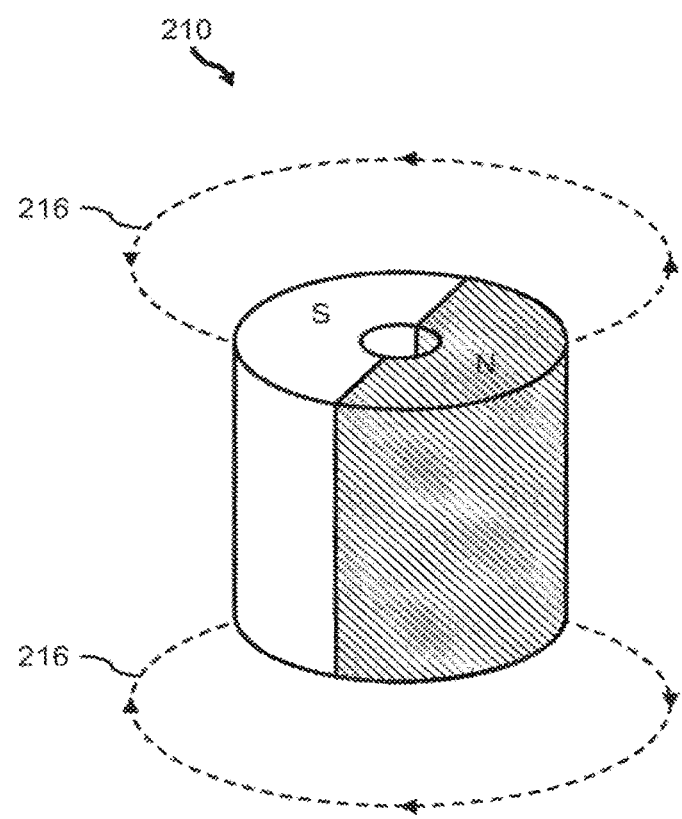
FIG. 12 illustrates a perspective view of an example of a magnet of the magnetic actuation mechanism shown in FIG. 8, wherein the magnet is diametrically magnetized.

Referring now to FIG. 12 is a perspective view of an example of magnet 210 of magnetic actuation mechanism 200 shown in FIG. 8, wherein magnet 210 is diametrically magnetized. The diametrically magnetized (DM) magnet 210 is hereafter called the DM magnet 210. In the DM magnet 210, the north and south poles are configured side-by-side along the length of motor shaft 212 (not shown). Accordingly, DM magnet 210 is magnetized transverse of motor shaft 212. In FIG. 12, the diametric magnetization is indicated via magnetic field lines 216 and showing the direction of the magnetic field from north to south. Further, when DM magnet 210 is spinning it provides a rotating magnetic field. Again, the magnetic flux density B of DM magnet 210 can be, for example, from about 10 mT to about 500 mT. Further, the magnetic field of DM magnet 210 as indicated by magnetic field lines 216 is an example of actuation force 152 as described with reference to FIG. 1.

Figure 13:
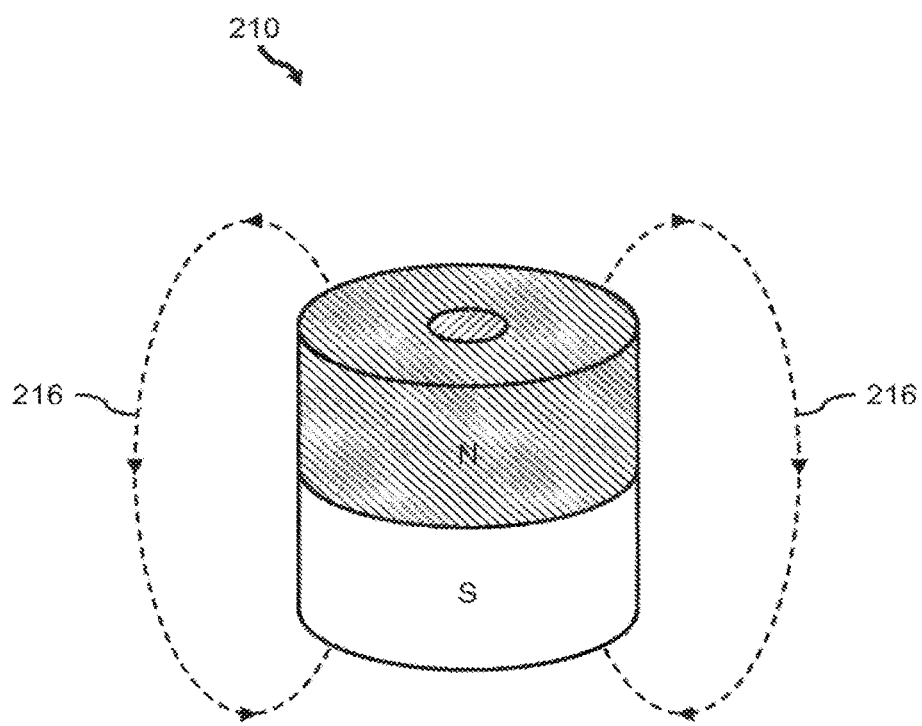
FIG. 13 illustrates a perspective view of an example of the magnet of the magnetic actuation mechanism shown in FIG. 8, wherein the magnet is axially magnetized.

Referring now to FIG. 13 is a perspective view of an example of magnet 210 of magnetic actuation mechanism 200 shown in FIG. 8, wherein magnet 210 is axially magnetized. The axially magnetized (AM) magnet 210 is hereafter called the AM magnet 210. In the AM magnet 210, the north and south poles are configured in a stacked fashion along the length of motor shaft 212 (not shown). Accordingly, AM magnet 210 is magnetized along the axis of motor shaft 212. In FIG. 13, the axial magnetization is indicated via magnetic field lines 216 and showing the direction of the magnetic field from north to south. Further, when AM magnet 210 is spinning it provides a rotating magnetic field. Again, the magnetic flux density B of AM magnet 210 can be, for example, from about 10 mT to about 500 mT. Further, the magnetic field of AM magnet 210 as indicated by magnetic field lines 216 is an example of actuation force 152 as described with reference to FIG. 1.

Figure 14:
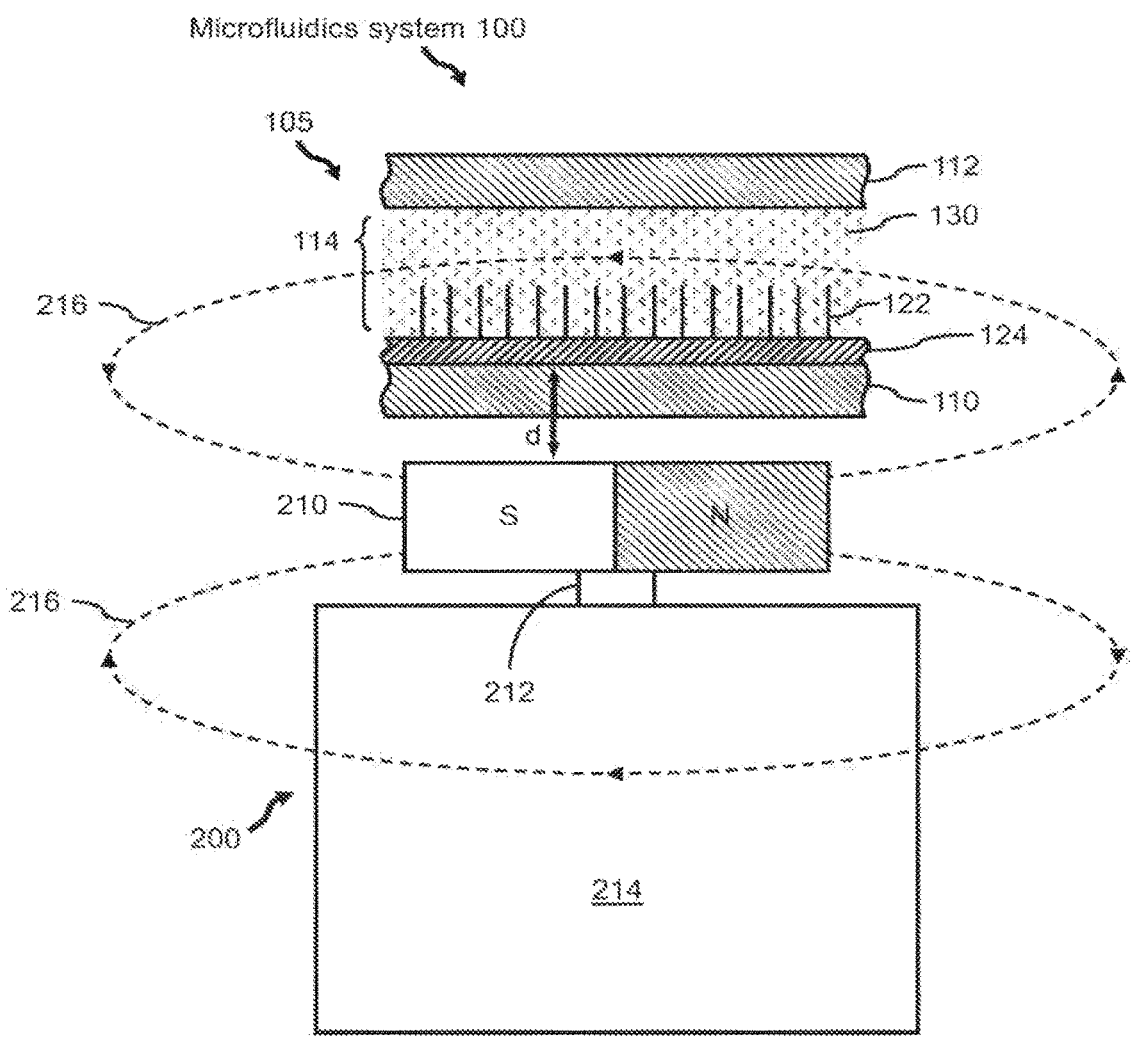
FIG. 14 illustrates a side view of the magnetic actuation mechanism shown in FIG. 8 that includes the diametrically magnetized magnet, wherein the diametrically magnetized magnet is arranged with respect to the microfluidics device.

Referring now to FIG. 14 is a side view of the magnetic actuation mechanism 200 shown in FIG. 8 that includes DM magnet 210, wherein DM magnet 210 is arranged with respect to microfluidics device 105. Again, DM magnet 210 can be cylinder-shaped. The diameter can be about equal to the area of microfluidics device 105. In one example, the diameter of DM magnet 210 is about 0.5 inches. Further, DM magnet 210 is set a certain distance d from microposts 122 in microfluidics device 105. The distance d can be, for example, from about 5 mm to about 15 mm. Additionally, the field strength of DM magnet 210 and/or the rpm of motor 214 can vary depending on the stiffness of microposts 122 and/or the viscosity of sample fluid 130.

Figure 15:
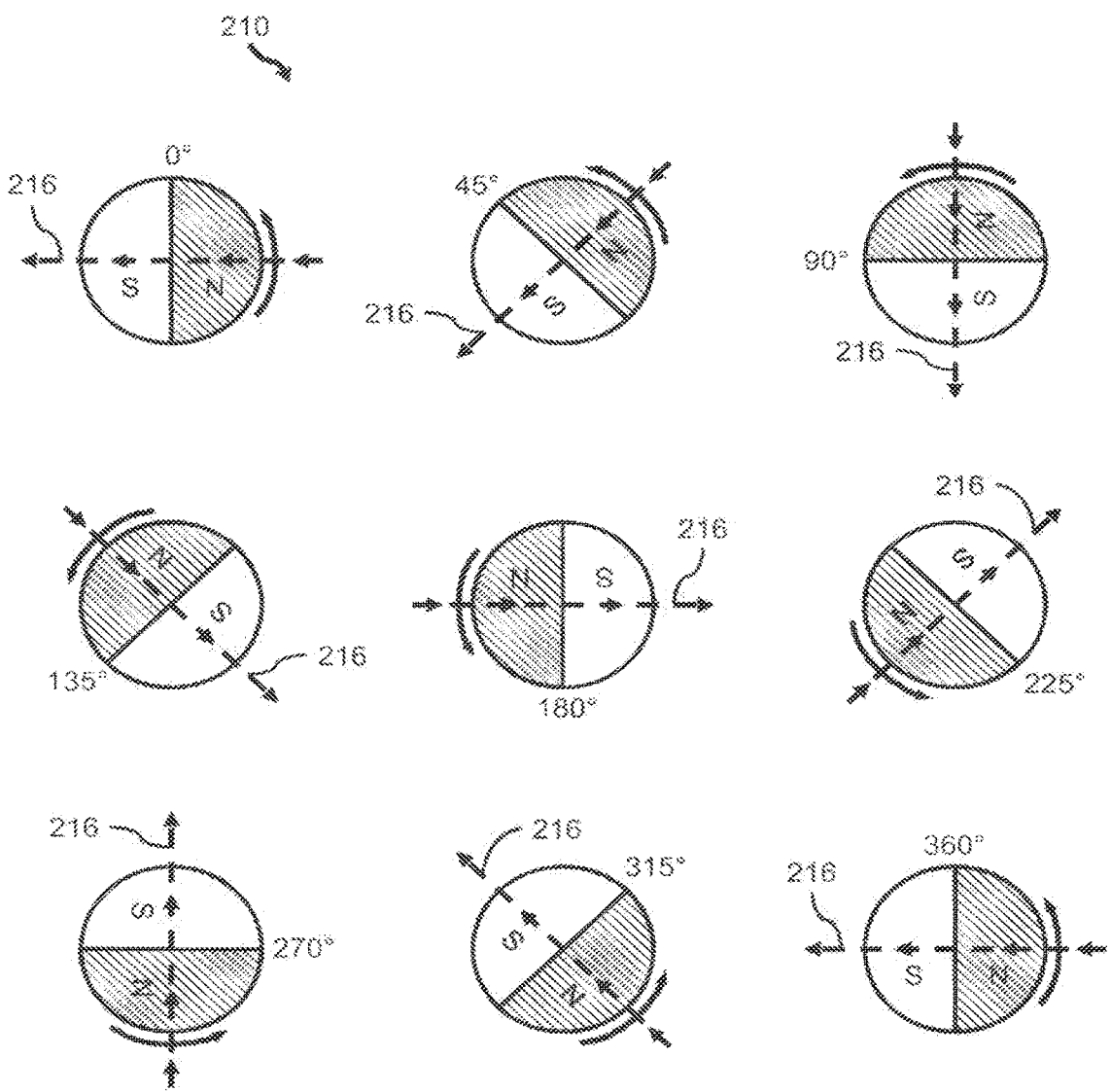
FIG. 15 shows a sequence of drawings that indicates the direction of the magnetic field through one full counter clockwise rotation of the diametrically magnetized magnet.
Figure 16:
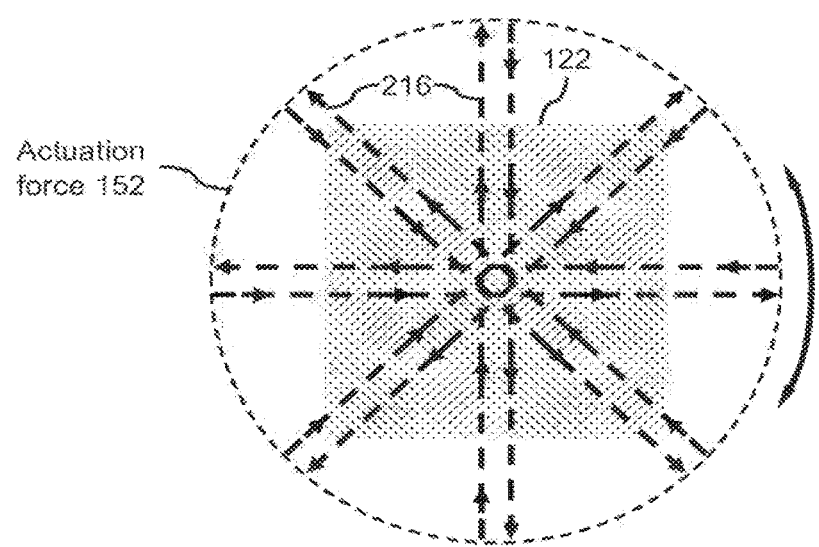
FIG. 16 shows an overlay of the magnetic field through one full rotation of the diametrically magnetized magnet atop a field of microposts.

The movable (e.g., rotatable) DM magnet 210 is oriented such that the axis of motor shaft 212 is substantially normal to the plane of reaction (or assay) chamber 114 that includes the field of microposts 122. The magnetic field of DM magnet 210, which is an example of actuation force 152, is indicated by magnetic field lines 216. The magnetic field is a moving (e.g., rotating) magnetic field that is moving (e.g., rotating) substantially in the plane of microposts 122. For example, FIG. 15 shows a sequence of drawings that indicates the direction of the magnetic field lines 216 through one full counter clockwise rotation of DM magnet 210. Namely, a top view of DM magnet 210 is shown along with the magnetic field lines 216 at 0°, then 45°, then 90°, then 135°, then 180°, then 235°, then 270°, then 315°, and then 360°. Further, FIG. 16 shows an overlay of the magnetic field lines 216 through one full rotation of DM magnet 210 atop a field of microposts 122 and thereby indicating a moving (e.g., rotating) magnetic field with respect to microposts 122 and in the same plane as microposts 122. The moving (e.g., rotating) magnetic field of DM magnet 210 is an example of actuation force 152 shown in FIG. 1.

Referring again to FIG. 12 through FIG. 16, magnet 210 of magnetic actuation mechanism 200 provides a moving (e.g., rotating) magnetic field, which is an example of actuation force 152 of magnetic actuation mechanism 150. Further, because the rpm of the spinning magnet 210 can vary, magnetic actuation mechanism 200 provides a time-varying magnetic field.

Figure 17A:
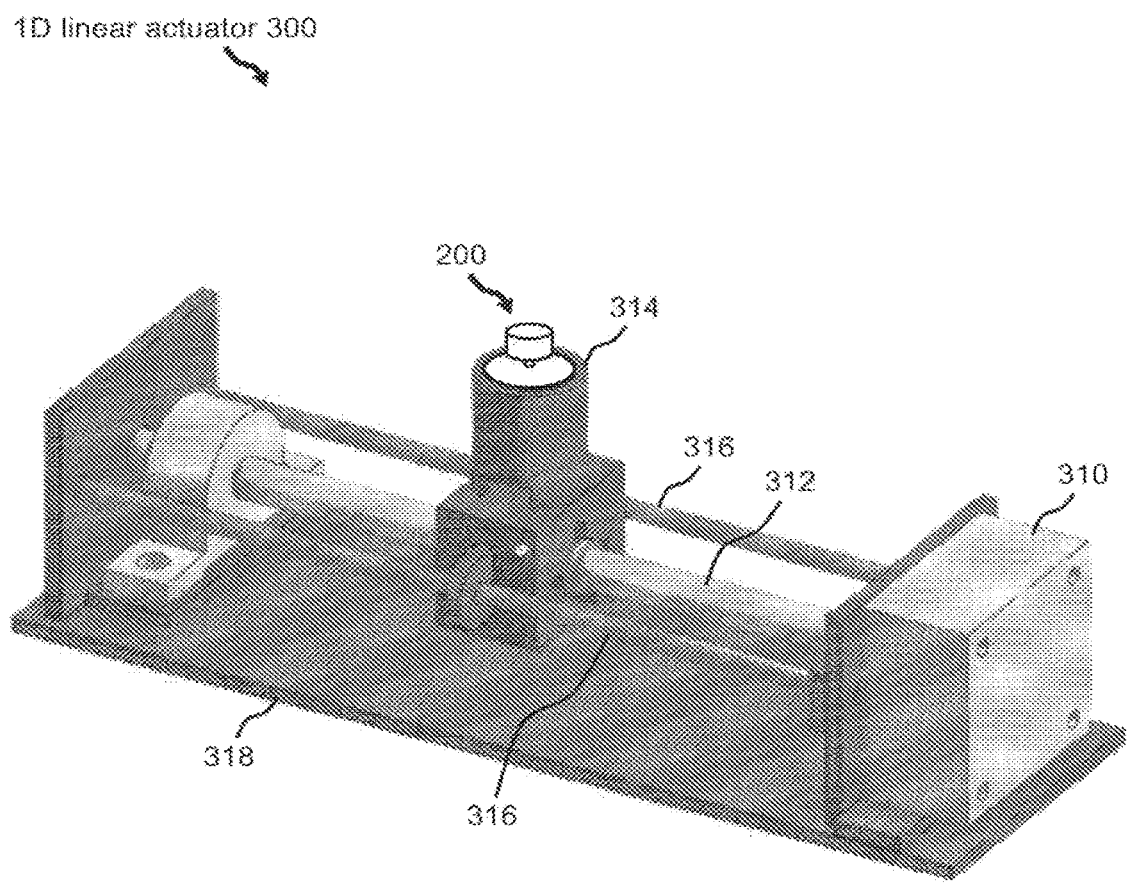
FIG. 17A and FIG. 17B illustrate perspective views of examples of linear actuators for rastering the presently disclosed magnetic-based actuation mechanisms.
Figure 17B:
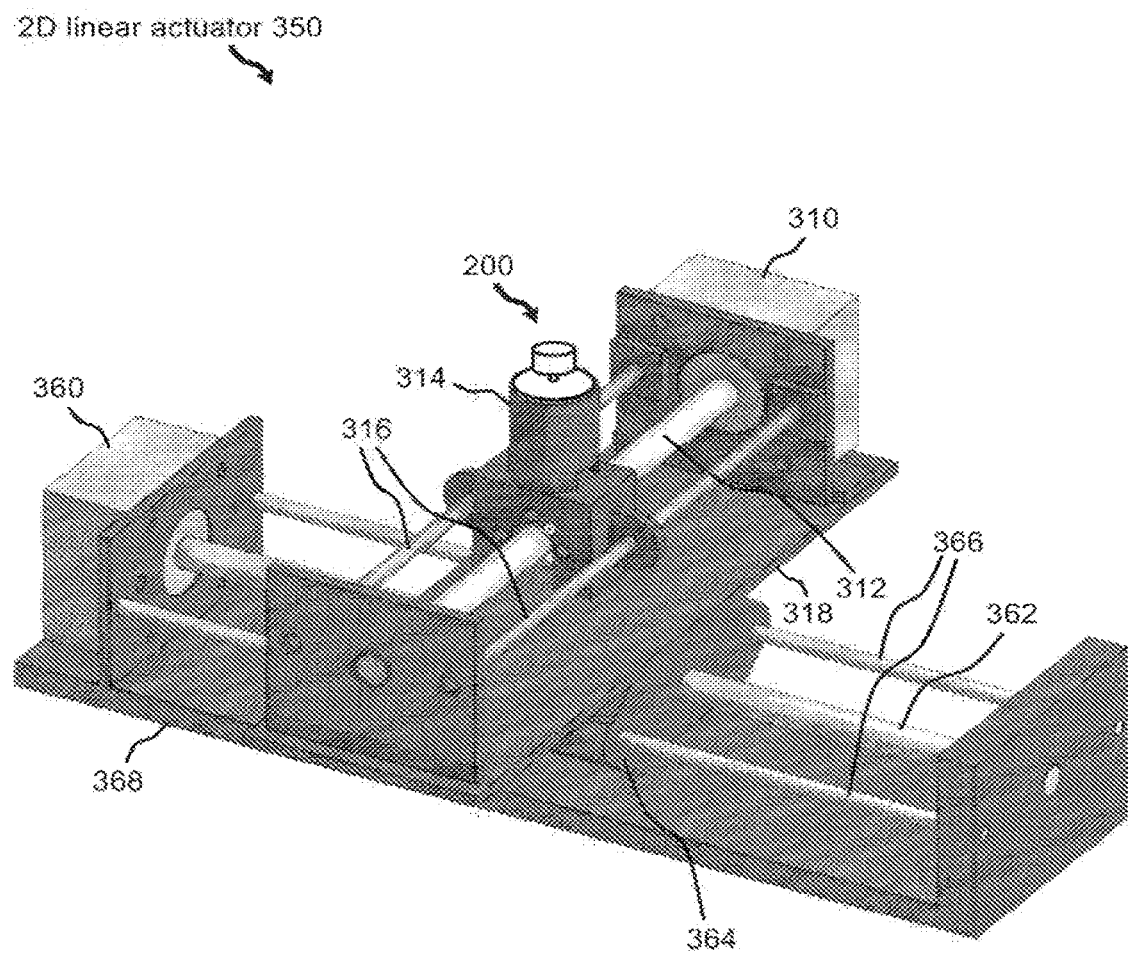

Referring now to FIG. 17A and FIG. 17B is perspective views of examples of linear actuators for rastering the presently disclosed magnetic-based actuation mechanisms. Namely, FIG. 17A shows a one-dimensional (1D) linear actuator 300 and FIG. 17B shows a two-dimensional (2D) linear actuator 350. 1D linear actuator 300 and 2D linear actuator 350 can be based, for example, on standard designs of 1D and 2D motorized linear translation stages.

1D linear actuator 300 includes, for example, a stepper motor 310 that drives a worm gear 312. 1D linear actuator 300 further includes a holder 314 that is threaded to and rides along worm gear 312 and that is stabilized by a pair of side rails 316. Stepper motor 310, worm gear 312, holder 314, and side rails 316 are all arranged with respect to a baseplate 318. Holder 314 is designed to hold any of the presently disclosed magnetic-based actuation mechanisms, such as magnetic actuation mechanism 200 shown in FIG. 8. 1D linear actuator 300 can be used, for example, to sca magnetic actuation mechanism 200 across (in X or Y) the area of any microfluidics device 105, wherein the microfluidics device 105 may include one or more reaction (or assay) chambers 114 having microposts 122 therein. In this example, 1D linear actuator 300 allows one magnetic actuation mechanism 200 to be used with multiple reaction (or assay) chambers 114. Further, when magnetic actuation mechanism 200 is not in use, 1D linear actuator 300 may be used to position magnetic actuation mechanism 200 at an area of microfluidics device 105 that has no reaction (or assay) chamber 114 or microposts 122.

2D linear actuator 350 includes 1D linear actuator 300 (i.e., a first linear translation stage) mounted orthogonally upon a second linear translation stage. The second linear translation stage includes, for example, a stepper motor 360 that drives a worm gear 362. 2D linear actuator 350 further includes a carrier platform 364 that is threaded to and rides along worm gear 362 and that is stabilized by a pair of side rails 366. Stepper motor 360, worm gear 362, carrier platform 364, and side rails 366 are all arranged with respect to a baseplate 368. Carrier platform 364 is designed to hold baseplate 318 of 1D linear actuator 300. That is, baseplate 318 of 1D linear actuator 300 can be mounted atop carrier platform 364 of 2D linear actuator 350. 2D linear actuator 350 can be used, for example, to scan magnetic actuation mechanism 200 across (in X and Y) the area of any microfluidics device 105, wherein the microfluidics device 105 may include one or more reaction (or assay) chambers 114 having microposts 122 therein. In this example, 2D linear actuator 350 allows one magnetic actuation mechanism 200 to be used with multiple reaction (or assay) chambers 114. Further, when magnetic actuation mechanism 200 is not in use, 2D linear actuator 350 may be used to position magnetic actuation mechanism 200 at an area of microfluidics device 105 that has no reaction (or assay) chamber 114 or microposts 122.

Further, in another example of a linear actuator, the linear translation stage(s) can be based on a spring-loaded rack-and-pinion or other mechanical store of potential energy for translating magnetic actuation mechanism 200 along a line. For example, instead of a linear actuator, holder 314 is attached to a rack and pinion bearing wherein the pinion winds a coil, and when the coil is released, holder 314 walks along the rack.

Further, in another example of linear actuation, a three-dimensional (3D) linear actuator can be provided for translating of magnetic actuation mechanism 200 in X, Y, and Z with respect to reaction (or assay) chamber 114 and microposts 122. With respect to the X direction, magnetic actuation mechanism 200 can be moved close to or away from the plane of microposts 122 using a 3D linear actuator. That is, the distance d shown in FIG. 14 can be variable using a 3D linear actuator. Then, depending on the distance d, the magnetic field (i.e., the actuation force) at microposts 122 can be strong when distance d is small and then reduced or entirely eliminated when distance d is large.

Figure 18:
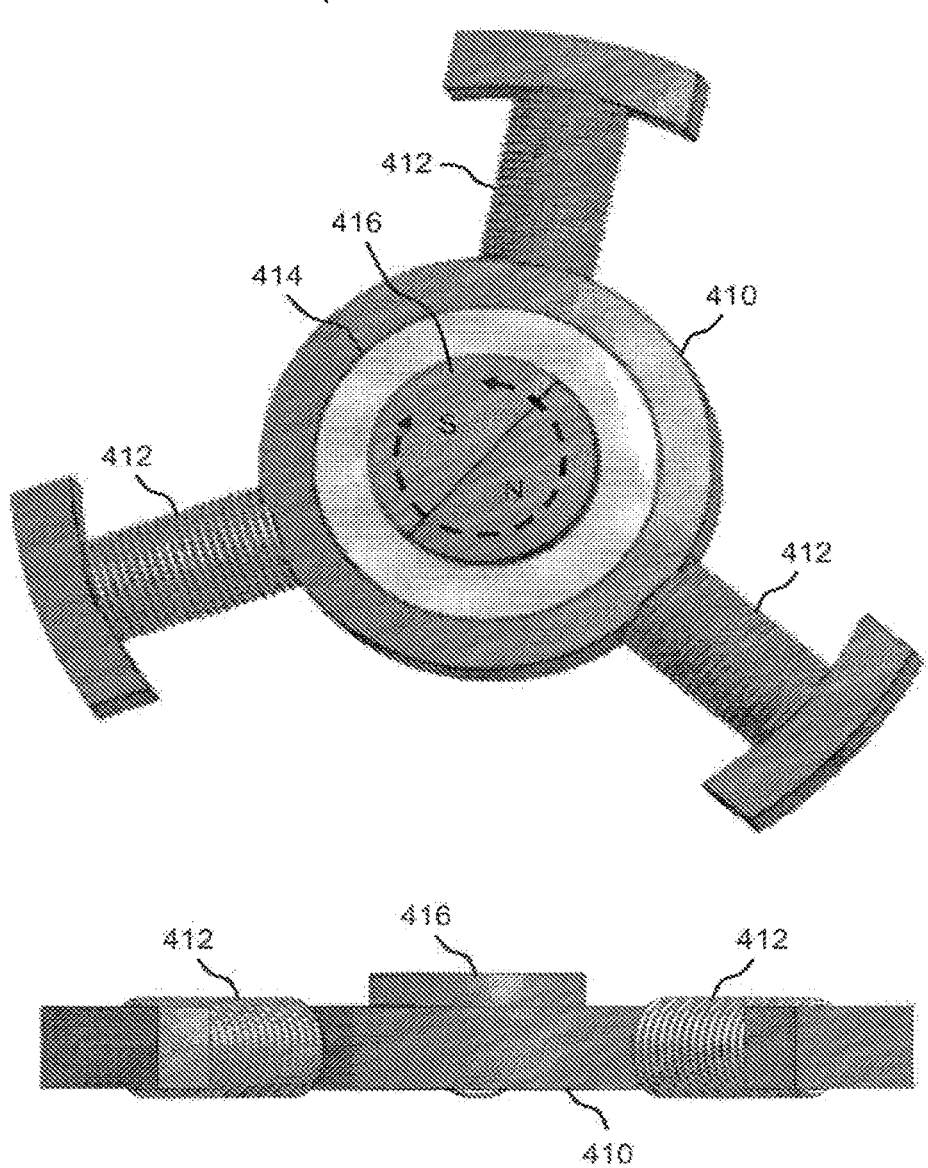
FIG. 18 illustrates a perspective view of a stator-based magnetic actuation mechanism, which is another example of the presently disclosed magnetic-based actuation mechanisms.

Referring now to FIG. 18 is a perspective view of a stator-based magnetic actuation mechanism 400, which is another example of the presently disclosed magnetic-based actuation mechanisms. Stator-based magnetic actuation mechanism 400 includes a stator ring 410 that supports a plurality of magnetic poles 412, a bearing 414, and a magnet 416. Magnet 416 is a solid permanent that is diametrically magnetized and is hereafter called the DM magnet 416.

Figure 19:
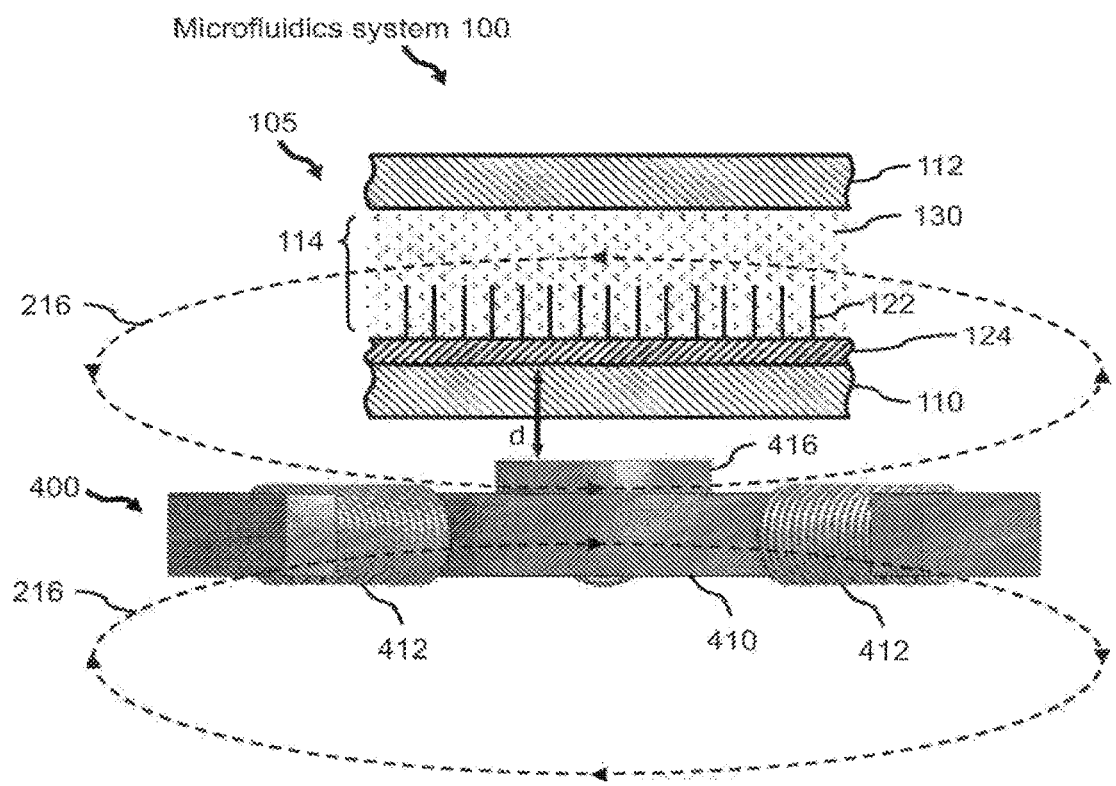
FIG. 19 illustrates a side view of the stator-based magnetic actuation mechanism shown in FIG. 18 arranged with respect to the microfluidics device shown in FIG. 4 and FIG. 5.

Stator-based magnetic actuation mechanism 400 operates much the same as a basic AC electric motor, wherein magnetic poles 412 are electromagnets that provide a moving (e.g., rotating) magnetic field. DM magnet 416 correlates to the rotor of the basic AC motor. Namely, stator ring 410 and magnetic poles 412 are held stationary while DM magnet 416 moves (e.g., rotates) with respect to magnetic poles 412 and wherein DM magnet 416 is constrained within stator ring 410 and bearing 414. Stator-based magnetic actuation mechanism 400 is not limited to three magnetic poles 412. Any number of magnetic poles 412 are possible. Stator-based magnetic actuation mechanism 400 provides a low profile magnetic-based actuation mechanism as compared, for example, with magnetic actuation mechanism 200 shown in FIG. 8. For example, FIG. 19 shows a side view of stator-based magnetic actuation mechanism 400 arranged with respect to microfluidics device 105. In this example, the overall Z dimension of microfluidics system 100 is reduced compared, for example, with the arrangement of magnetic actuation mechanism 200 and microfluidics device 105 shown in FIG. 14.

Figure 20:
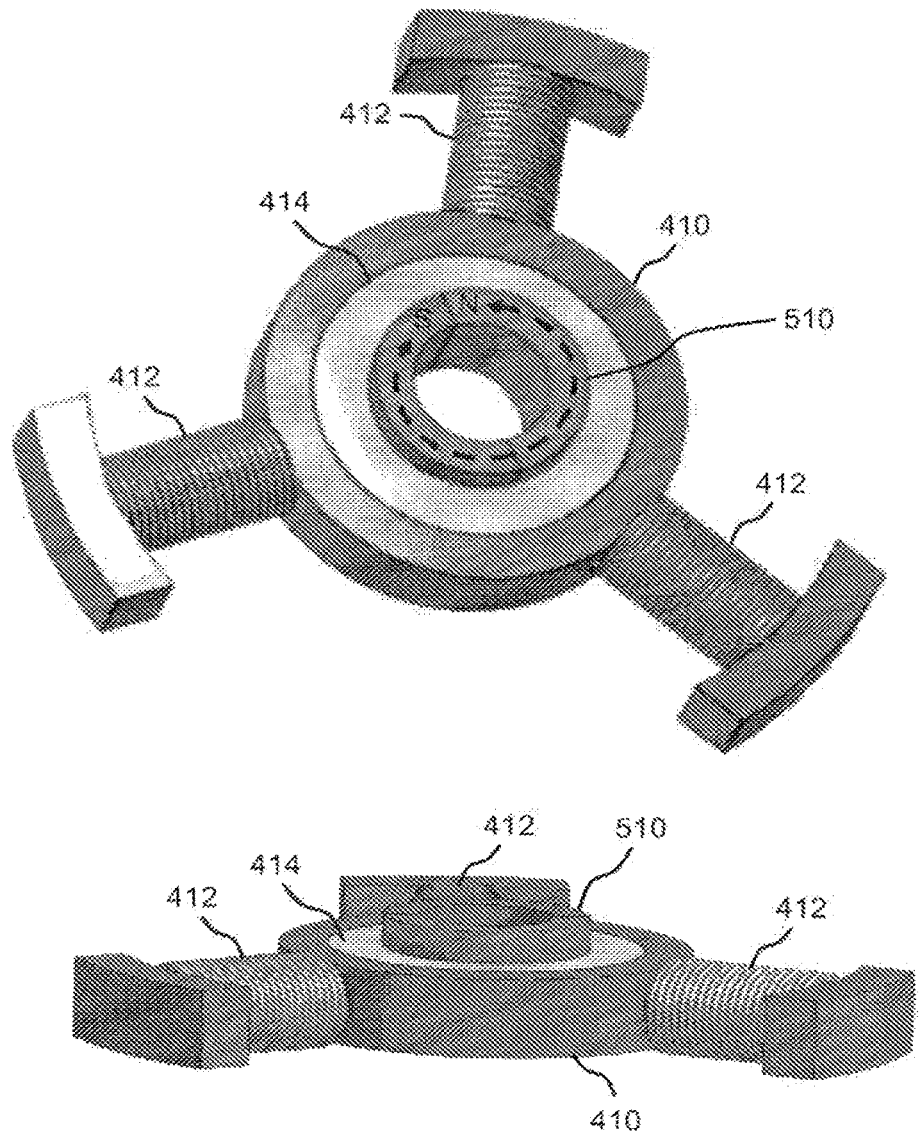
FIG. 20 illustrates a perspective view of another stator-based magnetic actuation mechanism, which is yet another example of the presently disclosed magnetic-based actuation mechanisms.

Referring now to FIG. 20 is a perspective view of a stator-based magnetic actuation mechanism 500, which is yet another example of the presently disclosed magnetic-based actuation mechanisms. Stator-based magnetic actuation mechanism 500 is substantially the same as stator-based magnetic actuation mechanism 400 described in FIG. 18 and FIG. 19 except that DM magnet 416 is replaced with a DM ring magnet 510. DM ring magnet 510 is a permanent ring magnet that is diametrically magnetized. Stator-based magnetic actuation mechanism 500 is designed such that a microfluidics device, such as microfluidics device 105, can be fitted into the opening of DM ring magnet 510 as shown, for example, in FIG. 21 (not drawn to scale). In this way, the magnetic force of DM ring magnet 510 is in the plane of microfluidics device 105. While stator-based magnetic actuation mechanism 500 can be arranged above or below microfluidics device 105 (like in FIG. 19), it operates more effectively with microfluidics device 105 fitted into the opening of DM ring magnet 510. Namely, the magnetic coupling between DM ring magnet 510 and the magnetically responsive microposts 122 is maximized when microfluidics device 105 is arranged within DM ring magnet 510. The configuration shown in FIG. 21 has a yet lower overall profile as compared with that shown in FIG. 14 and FIG. 19.

Figure 21:
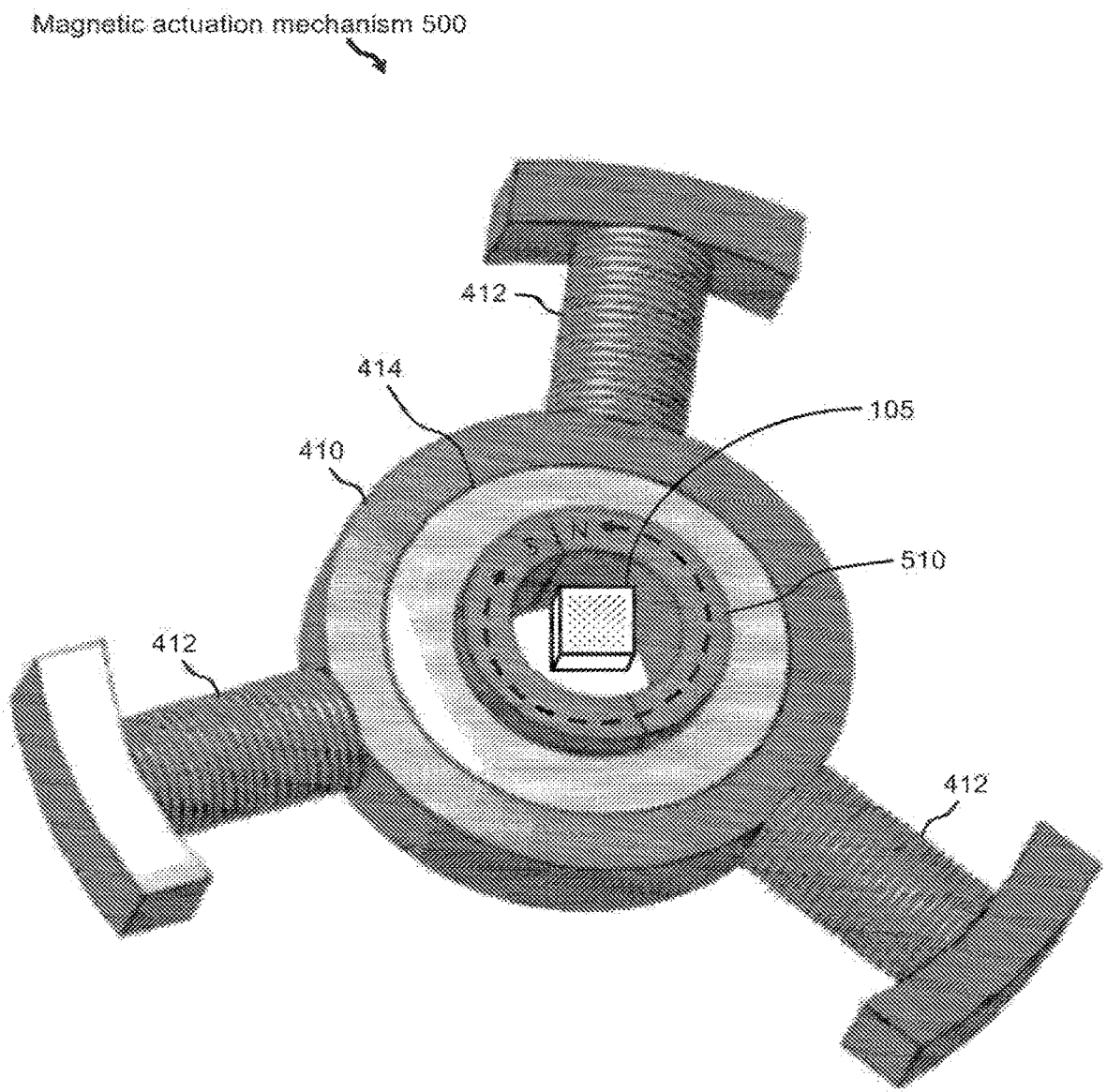
FIG. 21 illustrates a perspective view of the stator-based magnetic actuation mechanism shown in FIG. 20 with a microfluidics device arranged within the ring magnet thereof.

With respect to optical detection capability, the arrangement of magnetic actuation mechanism 200 to microfluidics device 105 shown in FIG. 14 as well as the arrangement of stator-based magnetic actuation mechanism 400 to microfluidics device 105 shown in FIG. 19 allow optical access from one side of microfluidics device 105. For example, in these configurations fluorescence optical access is allowed. However, an advantage of stator-based magnetic actuation mechanism 500 that has microfluidics device 105 fitted into the opening of DM ring magnet 510 (as shown in FIG. 21) is that it allows optical access from both sides of microfluidics device 105. Namely, there is a clear optical path from one side to the other of microfluidics device 105. This is because DM ring magnet 510 does not interfere with optical access from one side to the other of microfluidics device 105. As a result, stator-based magnetic actuation mechanism 500 allows transmission optical access.

Referring now again to FIG. 18 through FIG. 21, motor design is a well-known and those or ordinary skill in the art will recognize that the moving (e.g., rotating) magnet component in relation to microposts is the main novelty of the presently disclosed magnetic actuation mechanisms.

Figure 22:
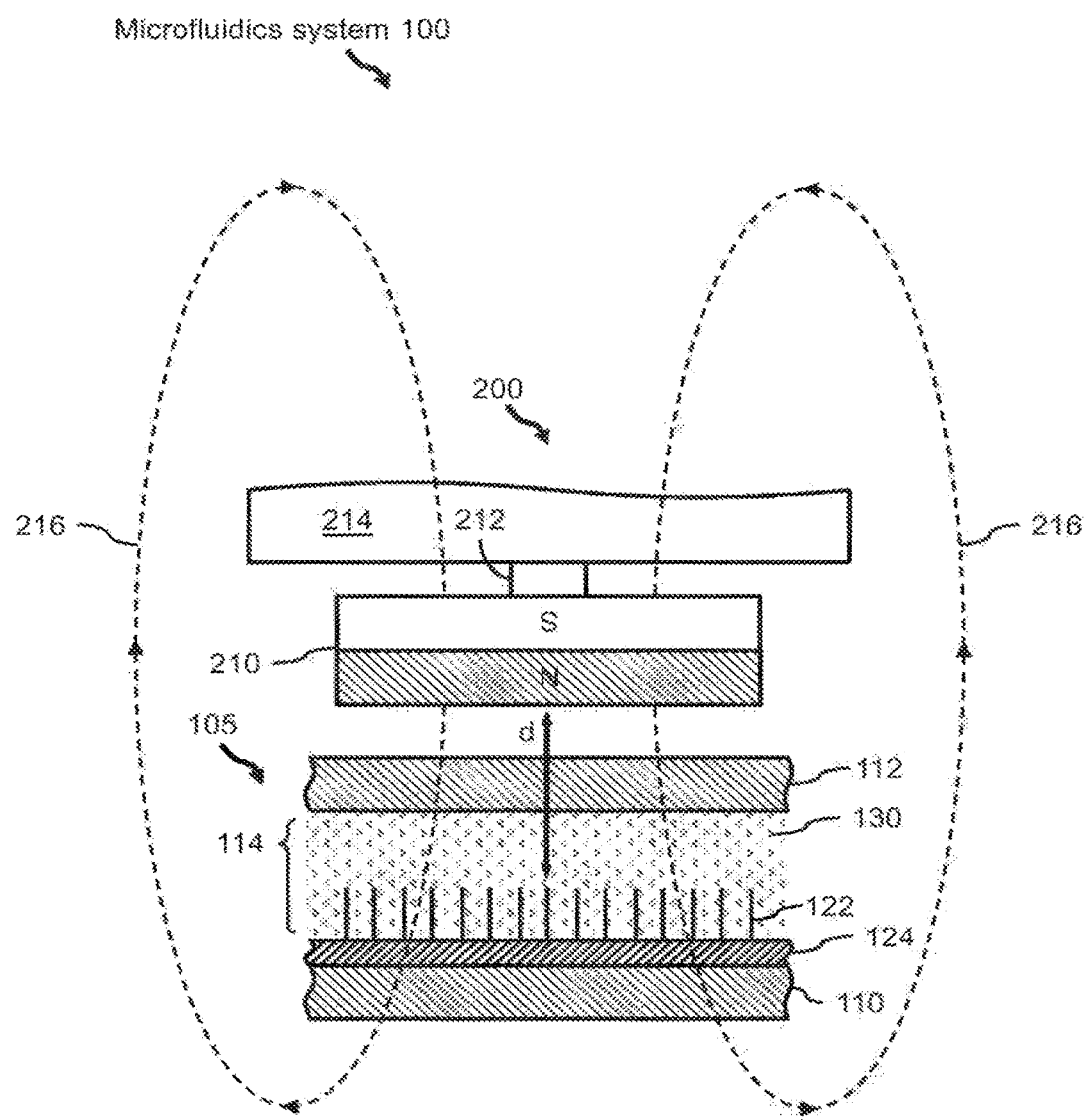
FIG. 22 illustrates a side view of the magnetic actuation mechanism shown in FIG. 8 arranged with respect to the microfluidics device, wherein the magnetic actuation mechanism includes an axially magnetized magnet.

Referring now to FIG. 22 is a side view of magnetic actuation mechanism 200 shown in FIG. 8 arranged with respect to microfluidics device 105, wherein magnetic actuation mechanism 200 includes AM magnet 210. The AM magnet 210 can be useful in applications for stiffening microposts 122. In this case, AM magnet 210 is arranged so that its magnetic flux density B is in the Z direction. For example, sometimes that action of loading fluid into the reaction (or assay) chamber knocks the microposts 122 down (due to the flow) and the microposts 122 remain in the knocked down position. However, AM magnet 210 of magnetic actuation mechanism 200 can be used to obviate this problem. Namely, the magnetic force of AM magnet 210 in the Z direction can be used to hold the microposts 122 in the upright position during the loading process or to return the microposts 122 to a substantially upright or vertical position after being knocked down. In another useful application, in a chamber that has no microposts a phenomenon known as Taylor dispersion may occur whereby the reagent, for example, flows into the chamber and collects at the far end. Taylor dispersion is an effect in fluid mechanics in which a shear flow can increase the effective diffusivity of a species. However, the presence of microposts 122 in the chamber may help to mitigate this problem, especially if held vertical using, for example, AM magnet 210 of magnetic actuation mechanism 200. Further, in this example, it is not a requirement that AM magnet 210 be spinning. Namely, whether the AM magnet 210 is spinning or not, the magnetic field does not vary. Accordingly, in this configuration, magnetic actuation mechanism 200 can be replaced with a stationary plate magnet.

Figure 23:
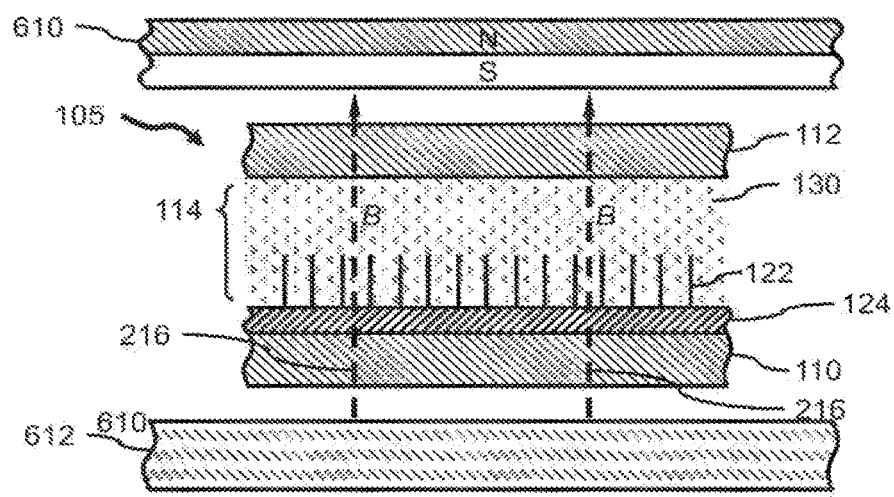
FIG. 23 illustrates a side view showing a configuration of the microfluidics system wherein the magnetic-based actuation mechanism is a pair of plate magnets arranged with respect to the microfluidics device.

Referring now to FIG. 23 is a side view showing a configuration of microfluidics system 100 wherein the magnetic-based actuation mechanism is a pair of plate magnets arranged with respect to microfluidics device 105. Namely, microfluidics system 100 includes a first plate magnet 610 arranged on one side of microfluidics device 105 and another plate magnet 610 arranged on the opposite side of microfluidics device 105. In this example, plate magnets 610 are polarized top to bottom (or bottom to top) and magnetic flux density B is in the Z direction. This configuration of microfluidics system 100 is another configuration that is useful to hold the microposts 122 in the upright position, i.e., for stiffening microposts 122.

Figure 24:
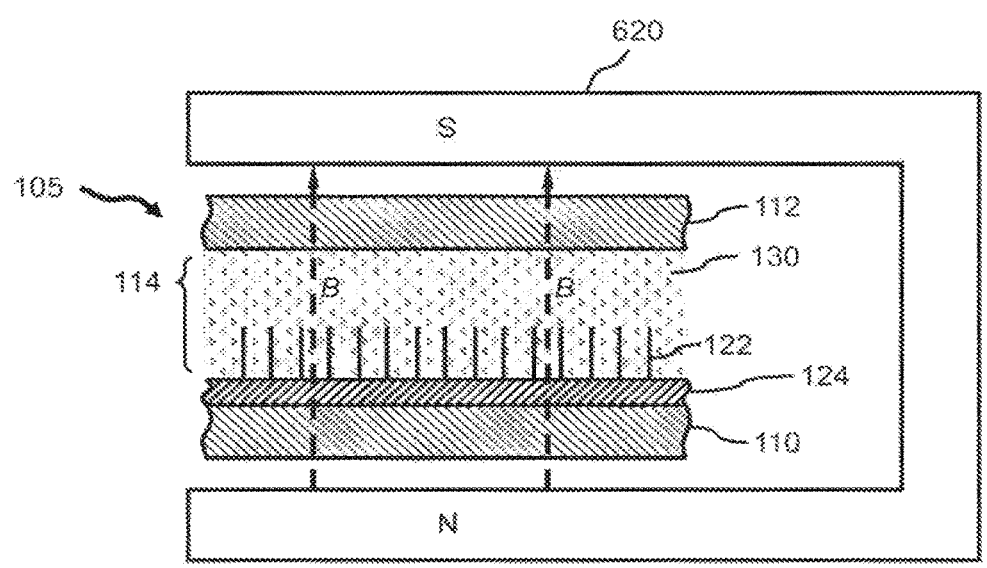
FIG. 24 illustrates a side view showing a configuration of the microfluidics system wherein the magnetic-based actuation mechanism is a horseshoe magnet arranged with respect to the microfluidics device.

Referring now to FIG. 24 is a side view showing a configuration of microfluidics system 100 wherein the magnetic-based actuation mechanism is a horseshoe magnet 620 arranged with respect to microfluidics device 105. Namely, the south pole of horseshoe magnet 620 is arranged on the side of microfluidics device 105 nearest the distal end of microposts 122 and the north pole of horseshoe magnet 620 is arranged on the side of microfluidics device 105 nearest the proximal end of microposts 122. This configuration of microfluidics system 100 is yet another configuration that is useful to hold the microposts 122 in the upright position, i.e., for stiffening microposts 122. Additionally, it may be arranged at an angle and spun around the chamber to create a time-varying field.

Figure 25:
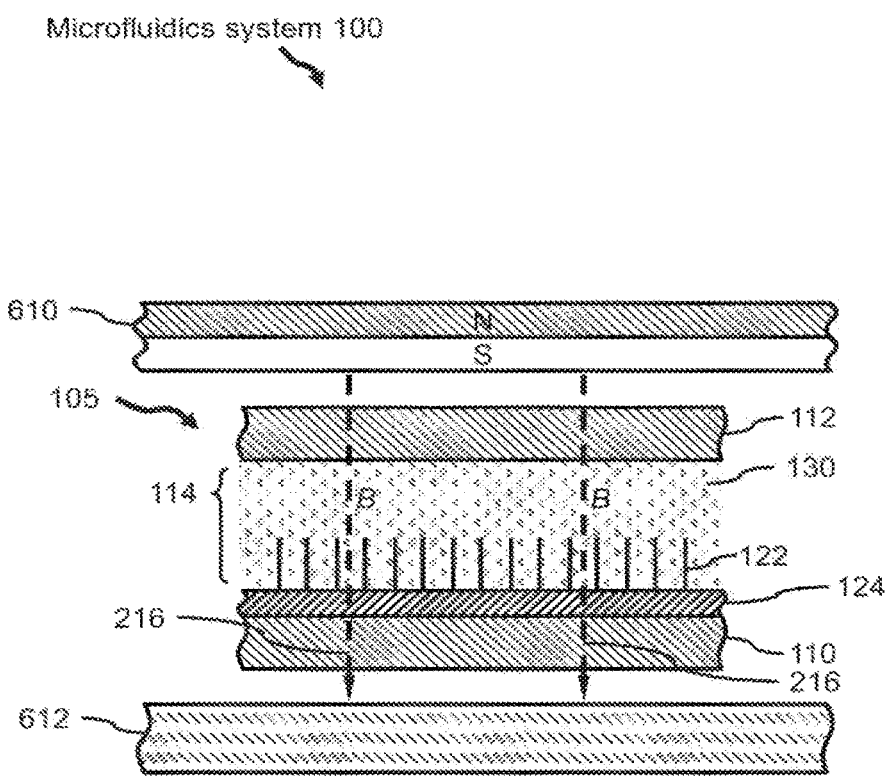
FIG. 25 illustrates a side view showing a configuration of the microfluidics system wherein the magnetic-based actuation mechanism is a plate magnet and a metal plate arranged with respect to the microfluidics device.

Referring now to FIG. 25 is a side view showing a configuration of microfluidics system 100 wherein the magnetic-based actuation mechanism is a plate magnet and a metal plate arranged with respect to microfluidics device 105. Namely, microfluidics system 100 includes one plate magnet 610 arranged on one side of microfluidics device 105 and a metal plate 612 arranged on the opposite side of microfluidics device 105. Metal plate 612 can be formed of any metal that has high magnetic permeability, such as, but not limited to, iron, nickel, and cobalt, as well as metal oxides. In this example, plate magnet 610 is polarized top to bottom (or bottom to top) and magnetic flux density B is in the Z direction. This configuration of microfluidics system 100 is yet another configuration that is useful to hold the microposts 122 in the upright position, i.e., for stiffening microposts 122.

Figure 26:
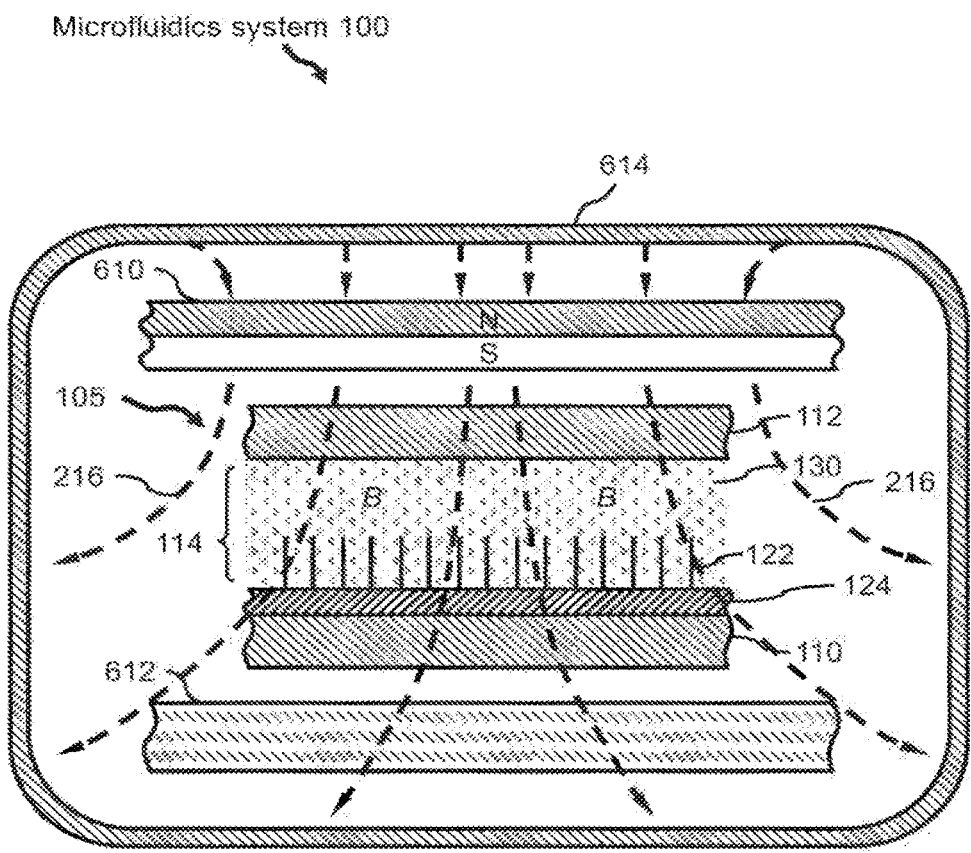
FIG. 26 illustrates a side view showing the microfluidics system of FIG. 23 or FIG. 25 enclosed in a magnetic shield.

Referring now to FIG. 26 is a side view showing the microfluidics system 100 of FIG. 23, FIG. 24, or FIG. 25 enclosed in a magnetic shield (e.g., foil). Namely, microfluidics system 100 is substantially entirely enclosed in a magnetic shield 614. Magnetic shield 614 can be, for example, any foil that has high magnetic permeability, such as, but not limited to, mu-metal foil or any other magnetic foil. Magnetic shield 614 is magnetized and directs the field lines back to the other side of the one or more plate magnets 610. Magnetic shield 614 can be used to direct the field lines to run in a desired direction. This configuration of microfluidics system 100 is still another configuration that is useful to hold the microposts 122 in the upright position, i.e., for stiffening microposts 122, because the magnetic flux density B is in the Z direction. Further, the magnetic field may be modified by using different shaped foil 614 and/or a different shaped metal plate 612.

Figure 27:
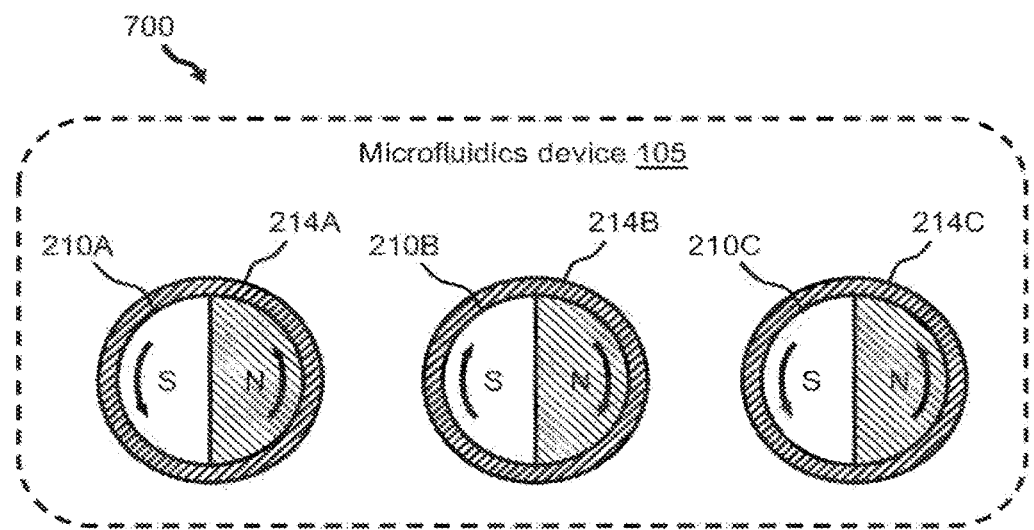
FIG. 27, FIG. 28, and FIG. 29 illustrate top views of examples of configurations of the presently disclosed the magnetic-based actuation mechanisms that include multiple movable (e.g., rotatable) magnets.
Figure 28:
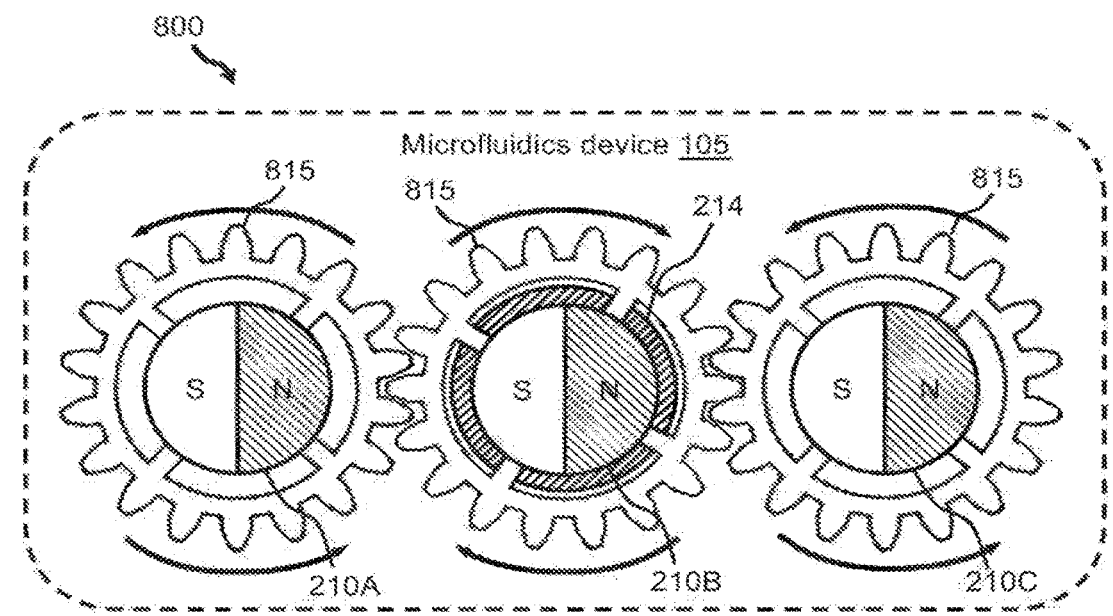
Figure 29:
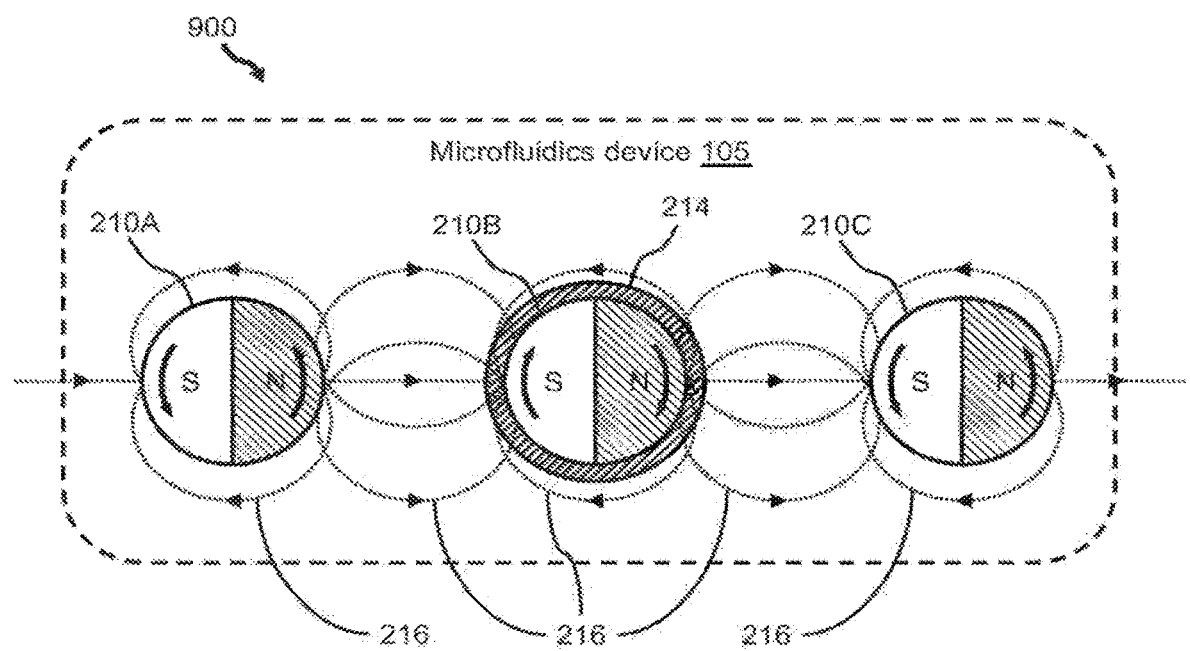

FIG. 27, FIG. 28, and FIG. 29 illustrate top views of examples of configurations of the presently disclosed the magnetic-based actuation mechanisms that include multiple movable (e.g., rotatable) magnets. Referring now to FIG. 27, a magnetic actuation mechanism 700 includes multiple movable magnets 210, wherein each of the movable magnets 210 has its own independently driven and controlled motor 214. In this example, magnetic actuation mechanism 700 includes three magnetic actuation mechanisms 200 (e.g., 200A, 200B, 200C).

Referring now to FIG. 28, a magnetic actuation mechanism 800 includes multiple movable magnets 210, wherein the multiple movable magnets 210 are movably (e.g., rotatably) coupled via gears and driven by a single motor 214. In this example, magnetic actuation mechanism 800 includes three magnets 210 (e.g., magnets 210A, 210B, 210C). Each of the magnets 210 is mounted to a gear 815. For example, magnet 210A is mounted to gear 815A, magnet 210B is mounted to gear 815B, and magnet 210C is mounted to gear 815C. In this example, gear 815B is flanked by and engaged with both gear 815A and gear 815C. Further, gear 815B is driven by a motor 214, while gears 815A and 815C are absent motors 214. However, this is exemplary only. Motor 214 can be connected to any one of the gears 815. That is, motor 214 can drive gear 815A or gear 815B or gear 815C. In this way, multiple magnets 210 can be driven by one motor 214.

Referring now to FIG. 29, a magnetic actuation mechanism 900 includes multiple movable magnets 210, wherein the multiple movable magnets 210 are movably (e.g., rotatably) coupled via magnetic coupling and driven by a single motor 214. Magnetic actuation mechanism 900 is an example of using gearless coupling of magnets. In this example, magnetic actuation mechanism 900 includes three magnets 210 (e.g., magnets 210A, 210B, 210C). In magnetic actuation mechanism 900, motor 214 is connected to one magnet 210, while the other two magnets 210 are driven passively because there is magnetic coupling between adjacent magnets 210. In this example, magnets 210A, 210B, 210C are arranged in a line. Magnet 210B is driven by motor 214, while magnets 210A and 210C are freestanding movable magnets that are not driven by a motor. Further, magnets 210A, 210B, and 210C are arranged suitably close together such that there is magnetic coupling therebetween. In operation, motor 214 is activated and magnet 210B moves (e.g., rotates). Then, because of the magnetic coupling of magnet 210B to both magnet 210A and magnet 210C, magnets 210A and 210C move (e.g., rotate), albeit in the opposite direction of magnet 210B. In this way, multiple magnets 210 can be driven by one motor 214.

In this example of magnetic actuation mechanism 900, magnet 210B is driven by a motor 214, while magnets 210A and 210C are absent motors 214. However, this is exemplary only. Namely, motor 214 can drive magnet 210A or magnet 210B or magnet 210C. That is, motor 214 can be connected to any one of the magnets 210 while the remaining two magnets 210 are absent motors 214.

Referring still to FIG. 27, FIG. 28, and FIG. 29, magnetic actuation mechanisms 700, 800, and 900 can be used, for example, with a microfluidics device 105 that includes multiple fields of microposts 122 and/or a large-area field of microposts 122. In one example, one field of microposts 122 can be actuated using magnet 210A, another field of microposts 122 can be actuated using magnet 210B, and yet another field of microposts 122 can be actuated using magnet 210C. In another example, one large-area field of microposts 122 can be actuated using the combination of magnet 210A, magnet 210B, and magnet 210C. Further, magnetic actuation mechanisms 700, 800, and 900 are not limited to the number and arrangement of magnets 210 shown in FIG. 27, FIG. 28, and FIG. 29. Magnetic actuation mechanisms 700, 800, and 900 can include any number of magnets 210 arranged in any lines, any arrays, any positions, and the like.

Figure 30:
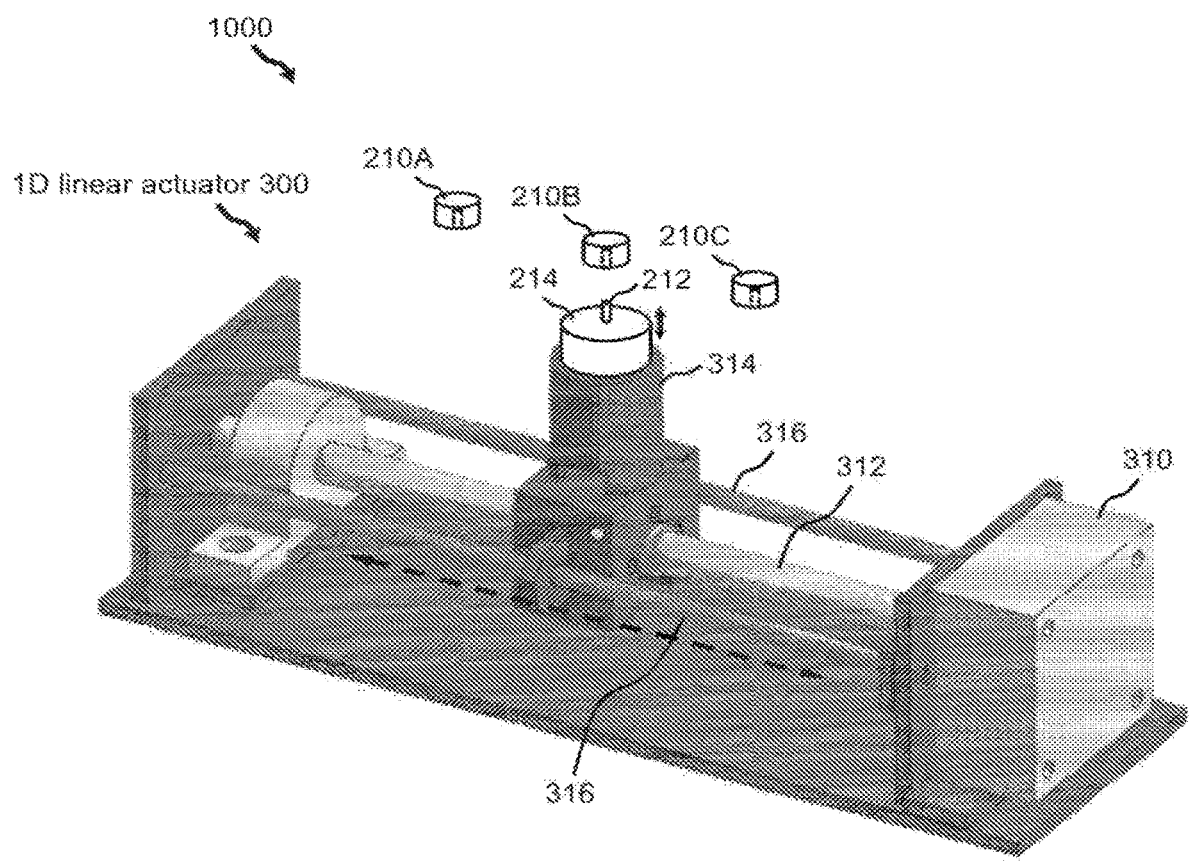
FIG. 30 illustrates a perspective view of an example of the presently disclosed the magnetic-based actuation mechanisms that includes multiple movable (e.g., rotatable) magnets that can be selectively driven by one motor.

Referring now to FIG. 30 is a perspective view of a magnetic actuation mechanism 1000, which is an example of the presently disclosed the magnetic-based actuation mechanisms that includes multiple movable (e.g., rotatable) magnets that can be selectively driven by one motor. For example, magnetic actuation mechanism 1000 may include the 1D linear actuator 300 shown in FIG. 17 in combination with multiple movable magnets 210 (e.g., magnets 210A, 210B, 210C) that are set at predetermined positions. Magnets 210A, 210B, 210C can be selectively driven by motor 214 that is installed in 1D linear actuator 300. Namely, motor 214 can be connected and disconnected from any given magnet 214 at any given time. Further, as well as moving linearly, motor 214 can be moved in the Z direction in order to engage and disengage motor shaft 212 with any of the magnets 210. In another configuration, instead of moving motor 214 in Z, the magnets 210 can be moved in Z. In operation, at one instance, 1D linear actuator 300 moves motor 214 to the position of magnet 210A and then motor shaft 212 is engaged with magnet 210A. Then, motor 214 can be activated to generate the desired actuation force at magnet 210A. Upon completion of the process, motor shaft 212 may be disengaged from magnet 210A. At a next instance, 1D linear actuator 300 moves motor 214 to the position of magnet 210B and then motor shaft 212 is engaged with magnet 210B. Then, motor 214 can be activated to generate the desired actuation force at magnet 210B. Upon completion of the process, motor shaft 212 may be disengaged from magnet 210B. At a next instance, 1D linear actuator 300 moves motor 214 to the position of magnet 210C and then motor shaft 212 is engaged with magnet 210C. Then, motor 214 can be activated to generate the desired actuation force at magnet 210B. Upon completion of the process, motor shaft 212 may be disengaged from magnet 210B.

Figure 31A:
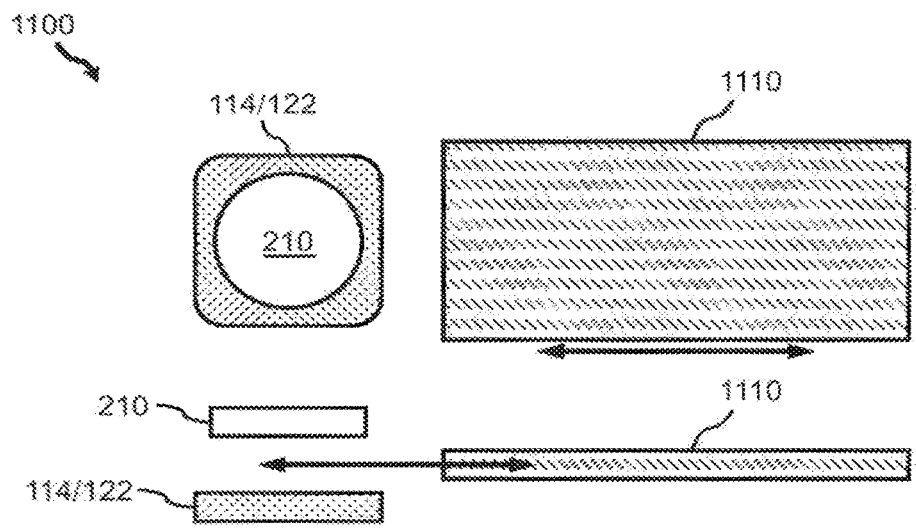
FIG. 31A and FIG. 31B illustrate various views of an example of the presently disclosed magnetic-based actuation mechanisms that includes magnetic shielding for controlling the actuation force.
Figure 31B:
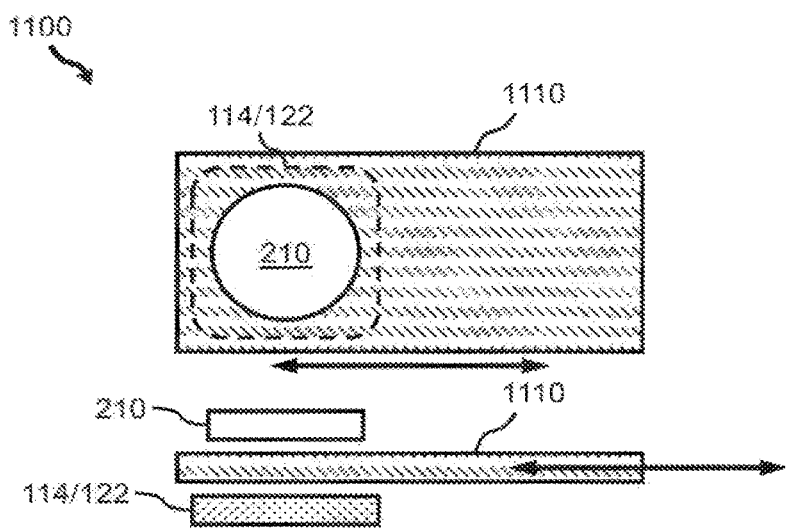

FIG. 31A and FIG. 31B illustrate top and side views of an example of the presently disclosed the magnetic-based actuation mechanisms that includes magnetic shielding for controlling the actuation force. Namely, a magnetic actuation mechanism 1100 includes, for example, magnet 210 arranged with respect to reaction (or assay) chamber 114 and including microposts 122. Additionally, magnetic actuation mechanism 1100 includes a magnetic shield member 1110 that is movably arranged in the plane between magnet 210 and reaction (or assay) chamber 114, as shown in FIG. 31A and FIG. 31B. Magnetic shield member 1110 can be, for example, a flat member formed of mu-metal. Mu-metal is a nickel-iron soft ferromagnetic alloy with very high permeability, which is used for shielding sensitive electronic equipment against static or low-frequency magnetic fields. Mu-metal has several compositions. One such composition is approximately 77% nickel, 16% iron, 5% copper and 2% chromium or molybdenum.

In one position and referring now to FIG. 31A, magnetic shield member 1110 is moved laterally away from magnet 210 and reaction (or assay) chamber 114 such that it does not interfere with the magnetic force of magnet 210. In this state the magnetic force of magnet 210, which is the actuation force, is free to reach microposts 122. In another position and referring now to FIG. 31B, magnetic shield member 1110 is moved laterally such that it is between magnet 210 and reaction (or assay) chamber 114. In so doing, the magnetic force of magnet 210, which is the actuation force, is blocked from reaching microposts 122. In this way, magnetic shield member 1110 can be used as a switch mechanism for switching off and on the actuation force to microposts 122. In other words, magnetic shield member 1110 can be used to selectively allow the magnetic field (i.e., the actuation force) of magnet 210 to reach the magnetically responsive microposts 122 or block the magnetic field of magnet 210 from reaching the magnetically responsive microposts 122.

Magnetic actuation mechanism 1100 is not limited to one magnetic shield member 1110 only. When, for example, there are multiple magnets 210 associated with microfluidics device 105, there may be multiple corresponding magnetic shield members 1110 for controlling the respective actuation forces. In another example, a certain microfluidics device 105 may have one large magnet 210 for servicing, for example, multiple fields of microposts 122 in common or one large-area field of microposts 122. In this case, multiple magnetic shield members 1110 can be used for controlling the actuation force to specific areas of the microfluidics device 105 and at specific times.

Figure 32A:
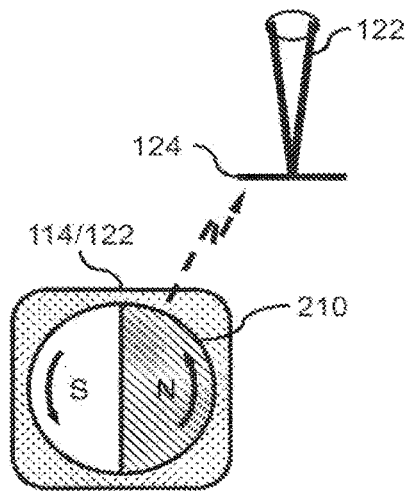
FIG. 32A and FIG. 32B illustrate various views of examples of using the presently disclosed magnetic-based actuation mechanisms for compelling microposts to exhibit certain types of motion.
Figure 32B:
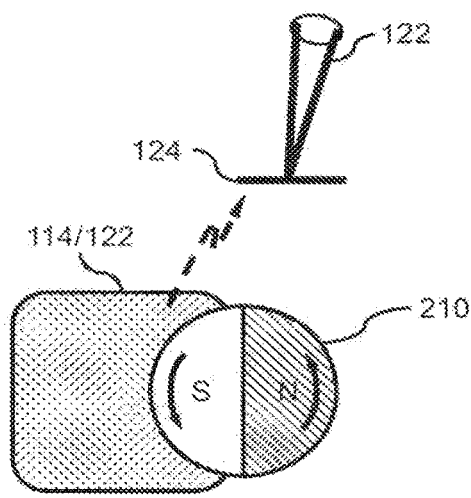

Referring now to FIG. 32A and FIG. 32B is various views of examples of using the presently disclosed magnetic-based actuation mechanisms for compelling micropost 122 to exhibit certain types of motion. In FIG. 32A, for example, the position of DM magnet 210 is substantially centered with respect to reaction (or assay) chamber 114 and its magnetically responsive microposts 122. In this configuration, in the not actuated state, each of the microposts 122 is oriented substantially normal to the plane of substrate 124. Then once actuated (once DM magnet 210 begins spinning), the distal end of the micropost 122 moves with circular motion with respect to the fixed proximal end, which is a cone-shaped motion. By contrast, FIG. 32B shows that the position of DM magnet 210 is off center with respect to reaction (or assay) chamber 114 and its magnetically responsive microposts 122. Because the actuation force is originating off center of reaction (or assay) chamber 114, each of the microposts 122 may be pulled at an angle from normal with respect to the plane of substrate 124 when in the not actuated state. Then once actuated (once DM magnet 210 begins spinning), the distal end of the angled micropost 122 moves with tilted circular motion with respect to the fixed proximal end, which is a tilted cone-shaped motion. In reaction (or assay) chamber 114, it may be that the tilted rotation can affect fluid flow in the direction of the tilt.

Figure 33:
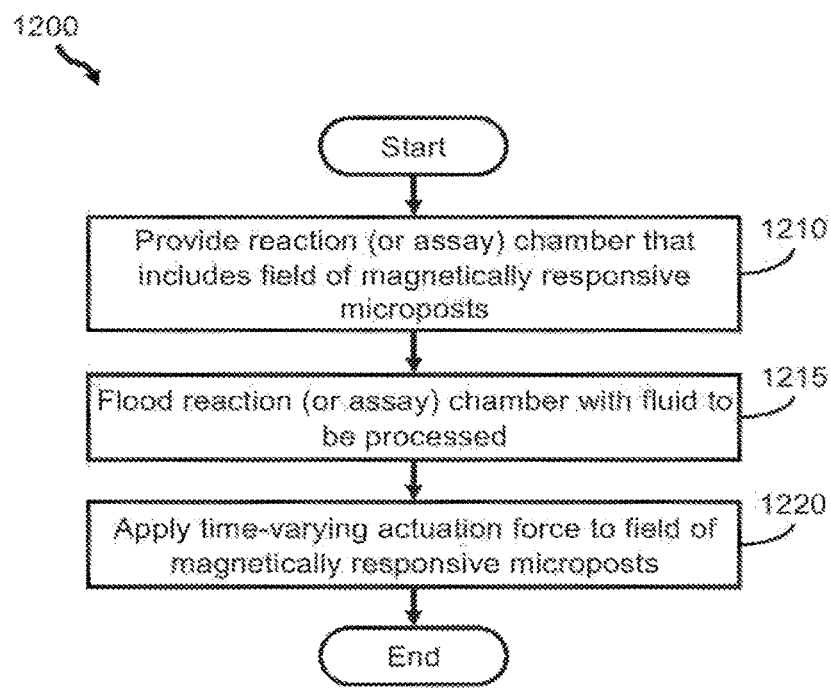
FIG. 33 illustrates a flow diagram of an example of a method of using the presently disclosed magnetic-based actuation mechanisms for actuating the magnetically responsive microposts.

Referring now to FIG. 33 illustrates a flow diagram of an example of a method 1200 of using the presently disclosed magnetic-based actuation mechanisms for actuating magnetically responsive microposts within a reaction (or assay) chamber. Method 1200 may include, but it not limited to, the following steps.

At a step 1210, a reaction (or assay) chamber is provided that includes a field of magnetically responsive microposts. For example, any one of the microfluidics devices 105 shown in FIG. 1 through FIG. 32B is provided that includes at least one reaction (or assay) chamber 114 in which a field of magnetically responsive microposts 122 is installed.

At a step 1215, the reaction (or assay) chamber is flooded with fluid to be processed (e.g., mixing operations, washing operations, binding operations, and cell processing operations). For example, reaction (or assay) chamber 114 of any one of the microfluidics devices 105 shown in FIG. 1 through FIG. 32B is flooded with fluid (e.g., sample fluid, liquid reagents, buffer solution) to be processed via, for example, mixing operations, washing operations, binding operations, and cell processing operations.

At a step 1220, a time-varying actuation force is applied to the field of magnetically responsive microposts. For example, in any one of the microfluidics devices 105 shown in FIG. 1 through FIG. 32B an actuation force 152 can be applied to microposts 122 via magnetic actuation mechanism 150 (see FIG. 1 through FIG. 7), and wherein the actuation force 152 can be a time-varying actuation force. Specific examples of magnetic actuation mechanism 150 include, but are not limited to, the magnetic actuation mechanism 200 shown in FIG. 8 through FIG. 17, the magnetic actuation mechanism 400 shown in FIG. 18 and FIG. 19, the stator-based magnetic actuation mechanism 500 shown in FIG. 20 and FIG. 21, and the like. The time-varying actuation force 152 provided by, for example, magnetic actuation mechanism 200, 400, and 500 is a moving (e.g., rotating) magnetic field. Using this moving (e.g., rotating) magnetic field, at least some of microposts 122 are compelled to exhibit motion. By actuating microposts 122 and causing motion thereof, the fluid is in effect stirred or caused to flow or circulate within gap 113 of reaction (or assay) chamber 114. In another example, an actuation force is applied to the field of magnetically responsive microposts 122 in order to stiffen microposts 122 or in order to return the microposts 122 to vertical, such as shown and described with reference to FIG. 23 through FIG. 26.

Figure 34:
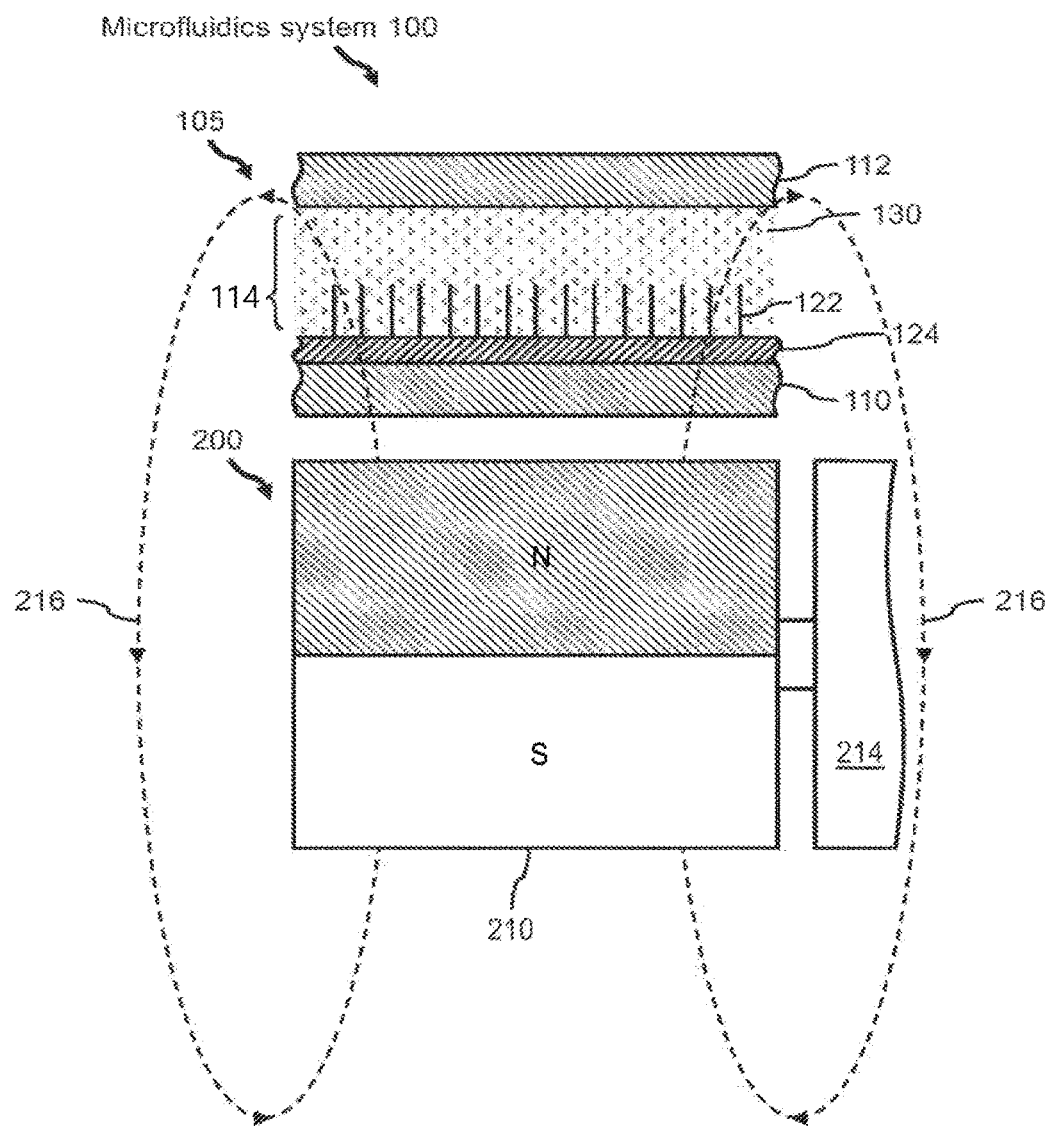
FIG. 34 illustrates a side view of another configuration of the microfluidics system wherein the magnetic actuation mechanism shown in FIG. 8 is oriented sideways with respect to the microfluidics device.

Referring now to FIG. 34 is a side view of another configuration of microfluidics system 100 wherein magnetic actuation mechanism 200 is oriented sideways with respect to microfluidics device 105. Namely, in, for example, the configurations shown in FIG. 14 and FIG. 22, magnetic actuation mechanism 200 is oriented such that the axis of rotation of magnet 210 is substantially normal to the plane of microposts 122. However, in this example, magnetic actuation mechanism 200 is oriented such that the axis of rotation of DM magnet 210 is substantially parallel to the plane of microposts 122. This orientation of DM magnet 210 provides a means to oscillate the magnetic flux density B with respect to microposts 122 and back and forth with respect to the X or Y of reaction (or assay) chamber 114. Namely, to provide this oscillation, DM magnet 210 is not spinning, instead DM magnet 210 is moved back and forth through 180°. Accordingly, the actuation force is not a rotating magnetic field, rather a magnetic field oscillating back and forth through 180°. The resulting motion that is imparted to microposts 122 may by useful, for example, to (1) enhance diffusion while at the same time inhibiting long range fluid transport, (2) optimize flow from the top to bottom of reaction (or assay) chamber 114, and/or (3) optimize lateral flow along a certain axis of reaction (or assay) chamber 114.

Referring now again to FIG. 1 through FIG. 34, in any of the presently disclosed magnetic-based actuation mechanisms that include a motor (e.g., motor 214), the motor may be powered by a battery. Further, in any of the presently disclosed magnetic-based actuation mechanisms that include a motor-driven element (e.g., magnet 210 driven motor 214), the magnet may be driven using a passive bearing and the energy is stored by mechanical means to be released at a specified time rather than driven by a motor and battery. For example, instead of a motor, the spinning magnet sits on a rotating bearing and is attached to a wound coil, which is released, causing the magnet to spin. Further, the presently disclosed magnetic-based actuation mechanisms can include any other combination of simple machines (e.g., ramps, bearings, levers) and mechanical energy storage devices (springs, coils, pendulums) that create the magnet motions described herein.

Further, in any of the presently disclosed magnetic-based actuation mechanisms that include a motor-driven element (e.g., magnet 210 driven motor 214), the motor may be switched off and on in any desired pattern and/or the duty cycle of motor can be controlled in any desired pattern. Both cases provide a time-dependent drive mechanism. In one example, the polarity of the magnetic field can be alternated by alternating the rotation direction (e.g., spinning the magnet 210 clockwise, then stopping and spinning magnet 210 counter clockwise). Further, in both cases, the magnetic field is not switched to zero. Rather, the magnetic field is still present but not changing in time and the magnetically responsive microposts 122 are not in the relaxed state. By contrast, the use of magnetic shielding (e.g., magnetic shield member 1110 of FIG. 31A and FIG. 31B) does bring the magnetic field to zero and the magnetically responsive microposts 122 are in the relaxed state.

Further, in other embodiments, microfluidics system 100 can include multiple types and/or configurations of the presently disclosed magnetic-based actuation mechanisms in combination with a single microfluidics device 105. Namely, any number, types, configurations, and/or combinations of the presently disclosed magnetic-based actuation mechanisms shown and described hereinabove with reference to FIG. 1 through FIG. 34 can be used in combination with a single microfluidics device 105 and/or with a single field magnetically responsive microposts 122.

In still other embodiments, a microfluidics system is provided comprising:

at least one microfluidic device comprising a reaction chamber, wherein the reaction chamber comprises an active surface, wherein the active surface is magnetically responsive; and at least one magnetic-based actuation mechanism provided in close proximity to the active surface, wherein the at least one magnetic-based actuation mechanism is configured to generate an actuation force sufficient to activate the active surface;

wherein the at least one magnetic-based actuation mechanism comprises one or more movable disc- or cylinder-shaped magnets, one or more plate magnets, one or more metal plates, one or more magnetic shields, or combinations thereof. In some embodiments, the active surface comprises a micropost field comprising surface-attached magnetically responsive microposts, wherein the at least one magnetic-based actuation mechanism is provided in close proximity to the magnetically responsive microposts, and wherein the at least one magnetic-based actuation mechanism is configured to generate an actuation force sufficient to compel at least some of the magnetically responsive microposts to exhibit motion.

In still other embodiments, a microfluidics system is provided comprising: at least one microfluidic device comprising a reaction chamber, wherein the reaction chamber comprises an active surface, wherein the active surface is magnetically responsive;

at least one magnetic-based actuation mechanism provided in close proximity to the active surface, wherein the at least one magnetic-based actuation mechanism is configured to generate an actuation force sufficient to activate the active surface; and one or more magnetic shields at least partially surrounding the at least one microfluidic device and/or the at least one magnetic-based actuation mechanism;

wherein the at least one magnetic-based actuation mechanism comprises one or more movable disc- or cylinder-shaped magnets, one or more plate magnets, one or more metal plates, or combinations thereof. In some embodiments, the one or more magnetic shields at least partially surround the at least one microfluidic device and are stationary. In other embodiments, the one or more magnetic shields at least partially surround the at least one magnetic-based actuation mechanism and are movable. In further embodiments, the at least one magnetic-based actuation mechanism is movable, and wherein the one or more magnetic shields are attached to and move with the at least one magnetic-based actuation mechanism. In still further embodiments, the active surface comprises a micropost field comprising surface-attached magnetically responsive microposts, wherein the at least one magnetic-based actuation mechanism is provided in close proximity to the magnetically responsive microposts, and wherein the at least one magnetic-based actuation mechanism is configured to generate an actuation force sufficient to compel at least some of the magnetically responsive microposts to exhibit motion.

Further, in other embodiments, the microfluidics system can include multiple types and/or configurations of the presently disclosed magnetic-based actuation mechanisms in combination with the presently disclosed microfluidics devices. Namely, any number, types, configurations, and/or combinations of the presently disclosed magnetic-based actuation mechanisms described hereinabove can be used in combination with microfluidics devices described hereinabove.

What is claimed is:

1. A microfluidics system comprising:
    at least one microfluidic device comprising a reaction chamber, wherein the reaction chamber comprises a micropost field, wherein the micropost field comprises surface-attached magnetically responsive microposts; and
    at least one magnetic-based actuation mechanism provided in close proximity to the surface-attached magnetically responsive microposts, wherein the at least one magnetic-based actuation mechanism is configured to generate an actuation force sufficient to compel at least some of the surface-attached magnetically responsive microposts to exhibit motion;
    wherein the at least one magnetic-based actuation mechanism comprises one or more moveable disc-or cylinder-shaped magnets, one or more plate magnets, one or more metal plates, one or more magnetic shields, or combinations thereof, and wherein the at least one magnetic-based actuation mechanism further comprises one or more of the following:
    (a) one or more moveable magnets coupled to a single motor, wherein the one or more moveable magnets are positioned directly above or directly below a plane of the micropost field, wherein the single motor is configured to rotate the one or more moveable magnets, and wherein the one or more moveable magnets are oriented such that the axis of rotation of the one or more moveable magnets is (1) above or below the plane of the micropost field and (2) normal or parallel to the plane of the micropost field;
    (b) one or more moveable magnets mounted on gears, wherein each of the one or more moveable magnets is mounted on its own gear, wherein one of the gears is driven by a single motor, and wherein all of the gears are configured to be directly or indirectly engaged with the gear driven by the single motor, such that the single motor drives and controls at least a subset of the gears and thereby drives and controls at least a subset of the one or more moveable magnets, wherein the one or more moveable magnets are rotatable by the magnetic-based actuation mechanism about their own axis; or
    (c) one or more moveable magnets, wherein the one or more multiple moveable magnets are set at predetermined positions, wherein the one or more moveable magnets are rotatable by the magnetic-based actuation mechanism about their own axis, and wherein a single motor is configured to be connected to or disconnected from any of the one or more moveable magnets.

2. The microfluidics system of claim 1, further comprising one or more magnetic shields at least partially surrounding the at least one microfluidic device and/or the at least one magnetic-based actuation mechanism.

3. The microfluidics system of claim 2, wherein the one or more magnetic shields at least partially surround the at least one microfluidic device and are stationary.

4. The microfluidics system of claim 2, wherein the one or more magnetic shields at least partially surround the at least one magnetic-based actuation mechanism and are moveable.

5. The microfluidics system of claim 2, wherein the at least one magnetic-based actuation mechanism is moveable, and wherein the one or more magnetic shields are attached to and move with the at least one magnetic-based actuation mechanism.

6. The microfluidics system of claim 2, wherein the one or more magnetic shields are arranged in a plane between the at least one magnetic-based actuation mechanism and the plane of the surface-attached magnetically responsive microposts and wherein the one or more magnetic shields are moveable and configured either for allowing the magnetic field of the at least one magnetic-based actuation mechanism to reach the surface-attached magnetically responsive microposts or for blocking the magnetic field of the at least one magnetic-based actuation mechanism from reaching the surface-attached magnetically responsive microposts.

7. The microfluidics system of claim 1, wherein the magnetic-based actuation mechanism comprises a magnet mounted on a motor shaft of a motor, and wherein the magnet is moveable.

8. The microfluidics system of claim 7, wherein the magnet is a permanent axially magnetized (AM) magnet and wherein the AM magnet comprises north and south poles configured in a stacked fashion along the length of the motor shaft, whereby the AM magnet is magnetized along the axis of the motor shaft.

9. The microfluidics system of claim 7, wherein the magnet has a magnetic flux density from about 10 millitesla (mT) to about 500 mT.

10. The microfluidics system of claim 1, further comprising a linear actuator configured to rasterize the magnetic-based actuation mechanism, wherein the linear actuator is a 1D actuator, a 2D actuator, or a 3D actuator.

11. The microfluidics system of claim 7, wherein the magnet is a permanent diametrically magnetized (DM) magnet.

12. The microfluidics system of claim 1, wherein in (b) or (c), the one or more moveable magnets are rotatable by the magnetic-based actuation mechanism about their own axis which is normal to the plane of the reaction chamber.

13. The microfluidics system of claim 1, wherein in (c), the single motor is coupled to a linear actuator and wherein the single motor is independently moveable in a direction parallel to the rotational axis of the one or more moveable magnets.

14. The microfluidics system of claim 1, wherein in (b), the single motor drives and controls all of the gears and thereby drives and controls all of the moveable magnets.

15. The microfluidics system of claim 11, wherein the DM magnet comprises north and south poles configured side-by-side along the length of the motor shaft, whereby the DM magnet is magnetized transverse to the motor shaft and wherein the DM magnet is oriented such that the axis of the motor shaft is substantially normal to the plane of the reaction chamber comprising the micropost field.

16. The microfluidics system of claim 15, wherein the DM magnet is configured to produce a moving magnetic field, wherein the moving magnetic field moves substantially in the plane of the surface-attached magnetically responsive microposts of the micropost field.

* * * * *